US011922938B1

(12) United States Patent
Khan et al.

(10) Patent No.: US 11,922,938 B1
(45) Date of Patent: Mar. 5, 2024

(54) ACCESS TO MULTIPLE VIRTUAL ASSISTANTS

(71) Applicant: Amazon Technologies, Inc., Seattle, WA (US)

(72) Inventors: Yaser Khan, Kirkland, WA (US); Piyush Kandpal, Bellevue, WA (US); Ritesh Patel, Redmond, WA (US); Mark Lawrence, Bainbridge Island, WA (US); Srinivas Palla, Redmond, WA (US); Ashish Rangole, Bellevue, WA (US); Jason Wang, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 290 days.

(21) Appl. No.: 17/532,586

(22) Filed: Nov. 22, 2021

(51) Int. Cl.
| | |
|---|---|
| *G10L 15/00* | (2013.01) |
| *G10L 13/02* | (2013.01) |
| *G10L 15/18* | (2013.01) |
| *G10L 15/22* | (2006.01) |
| *G10L 15/30* | (2013.01) |
| *G10L 15/32* | (2013.01) |

(52) U.S. Cl.
CPC .............. *G10L 15/22* (2013.01); *G10L 13/02* (2013.01); *G10L 15/1815* (2013.01); *G10L 15/30* (2013.01); *G10L 15/32* (2013.01); *G10L 2015/223* (2013.01)

(58) Field of Classification Search
CPC ......... G10L 15/08; G10L 15/18; G10L 15/22; G10L 15/24; G10L 18/32
See application file for complete search history.

(56) References Cited

U.S. PATENT DOCUMENTS

| | | | |
|---|---|---|---|
| 7,689,421 B2 | 3/2010 | Li et al. | |
| 8,938,394 B1 | 1/2015 | Faaborg et al. | |
| 9,293,134 B1 | 3/2016 | Saleem et al. | |
| (Continued) | | | |

FOREIGN PATENT DOCUMENTS

| | | | | |
|---|---|---|---|---|
| CA | 3025198 C | * | 8/2021 | ............. G06F 21/41 |
| WO | 2016085776 A1 | | 6/2016 | |
| (Continued) | | | | |

OTHER PUBLICATIONS

The Examiner's attention is hereby drawn to the specification and file history of co-pending U.S. Appl. No. 16/216,438, titled "Multiple Speech Processing System With Synthesized Speech Styles," filed Dec. 11, 2018, which may contain information relevant to the present application.

(Continued)

*Primary Examiner* — Shreyans A Patel
(74) *Attorney, Agent, or Firm* — Pierce Atwood LLP

(57) ABSTRACT

A multi-assistant speech-processing system that centrally determines multiple execution plans to respond to a user input. A central component determines whether a particular input should be processed using a requested assistant or a different assistant or should be terminated. Assistant handoff may be determined based on system policies as well as user input-specific data. A ranked list of execution options may be supplemented by augmented data corresponding to messages to a user. The system may attempt to execute plans in the ranked order until a plan succeeds.

20 Claims, 16 Drawing Sheets

(56) References Cited

U.S. PATENT DOCUMENTS

| | | |
|---|---|---|
| 9,424,840 B1 | 8/2016 | Hart et al. |
| 9,495,129 B2 | 11/2016 | Fleizach et al. |
| 9,601,115 B2 | 3/2017 | Chen et al. |
| 9,640,180 B2 | 5/2017 | Chen et al. |
| 9,966,065 B2 | 5/2018 | Gruber et al. |
| 9,972,318 B1 | 5/2018 | Kelly et al. |
| 10,089,072 B2 | 10/2018 | Piersol et al. |
| 10,170,123 B2 | 1/2019 | Orr et al. |
| 10,304,444 B2 | 5/2019 | Mathias et al. |
| 10,365,887 B1 | 7/2019 | Mulherkar |
| 10,374,816 B1 | 8/2019 | Leblang et al. |
| 10,388,272 B1 | 8/2019 | Thomson et al. |
| 10,497,365 B2 | 12/2019 | Gruber et al. |
| 10,536,286 B1 | 1/2020 | Leblang et al. |
| 10,536,287 B1 | 1/2020 | Leblang et al. |
| 10,536,288 B1 | 1/2020 | Leblang et al. |
| 10,540,976 B2 | 1/2020 | Van Os et al. |
| 10,559,309 B2 | 2/2020 | Carbune et al. |
| 10,573,312 B1 | 2/2020 | Thomson et al. |
| 10,586,540 B1 | 3/2020 | Smith et al. |
| 10,600,419 B1 | 3/2020 | Sarikaya et al. |
| 10,692,489 B1 | 6/2020 | Grizzel |
| 10,789,041 B2 | 9/2020 | Kim et al. |
| 10,854,188 B2 | 12/2020 | Nygaard et al. |
| 10,957,313 B1 | 3/2021 | Sarikaya et al. |
| 10,957,329 B1 | 3/2021 | Liu et al. |
| 10,971,153 B2 | 4/2021 | Thomson et al. |
| 10,971,158 B1 | 4/2021 | Patangay et al. |
| 11,495,240 B1 * | 11/2022 | Pierce-Durance .... G10L 19/173 |
| 2003/0182131 A1 | 9/2003 | Arnold et al. |
| 2012/0150543 A1 | 6/2012 | Teegan |
| 2015/0169336 A1 | 6/2015 | Harper et al. |
| 2015/0185996 A1 | 7/2015 | Brown et al. |
| 2015/0302002 A1 | 10/2015 | Mathias et al. |
| 2015/0317302 A1 | 11/2015 | Liu et al. |
| 2015/0379568 A1 | 12/2015 | Balasubramanian et al. |
| 2016/0035353 A1 | 2/2016 | Chen et al. |
| 2016/0180853 A1 * | 6/2016 | VanLund .............. G06F 9/5011 704/275 |
| 2016/0359862 A1 * | 12/2016 | Riva ................... H04W 12/088 |
| 2016/0379636 A1 | 12/2016 | Panin |
| 2016/0379638 A1 | 12/2016 | Basye et al. |
| 2017/0278514 A1 | 9/2017 | Mathias et al. |
| 2017/0300831 A1 * | 10/2017 | Gelfenbeyn ........ G06F 16/3329 |
| 2018/0144737 A1 | 5/2018 | Agiomyrgiannakis et al. |
| 2018/0182397 A1 | 6/2018 | Carbune et al. |
| 2018/0204569 A1 | 7/2018 | Nadkar et al. |
| 2018/0278514 A1 | 9/2018 | Chadha |
| 2018/0286391 A1 | 10/2018 | Carey et al. |
| 2018/0338191 A1 | 11/2018 | van Scheltinga et al. |
| 2018/0358019 A1 | 12/2018 | Mont-Reynaud |
| 2019/0051302 A1 | 2/2019 | Gonzalez et al. |
| 2019/0066685 A1 | 2/2019 | Liddell et al. |
| 2019/0130915 A1 | 5/2019 | Nitz et al. |
| 2019/0206411 A1 | 7/2019 | Li et al. |
| 2019/0221552 A1 | 7/2019 | Bower et al. |
| 2019/0251960 A1 | 8/2019 | Maker et al. |
| 2019/0311715 A1 | 10/2019 | Pfeffinger et al. |
| 2019/0325864 A1 | 10/2019 | Anders et al. |
| 2019/0378519 A1 | 12/2019 | Dunjic et al. |
| 2020/0020341 A1 | 1/2020 | Shi |
| 2020/0168217 A1 | 5/2020 | Webster et al. |
| 2020/0175961 A1 | 6/2020 | Thomson et al. |
| 2020/0175987 A1 | 6/2020 | Thomson et al. |
| 2020/0184967 A1 | 6/2020 | Gupta et al. |
| 2020/0193264 A1 | 6/2020 | Zavesky et al. |
| 2020/0227039 A1 | 7/2020 | Liu et al. |
| 2020/0258509 A1 | 8/2020 | Bharadwaj et al. |
| 2020/0286474 A1 | 9/2020 | Shoop et al. |
| 2020/0342866 A1 | 10/2020 | Casado et al. |
| 2021/0082397 A1 | 3/2021 | Kennewick |
| 2021/0090555 A1 | 3/2021 | Mahmood et al. |
| 2021/0090572 A1 | 3/2021 | Mahmood et al. |
| 2021/0090575 A1 | 3/2021 | Mahmood et al. |

FOREIGN PATENT DOCUMENTS

| | | |
|---|---|---|
| WO | 2018009897 A1 | 1/2018 |
| WO | WO-2022149620 A1 * | 7/2022 |

OTHER PUBLICATIONS

The Examiner's attention is hereby drawn to the specification and file history of co-pending U.S. Appl. No. 16/571,787, titled "Speech-Processing System," filed Sep. 16, 2019, which may contain information relevant to the present application.

The Examiner's attention is hereby drawn to the specification and file history of co-pending U.S. Appl. No. 16/580,307, titled "Multi-Assistant Natural Language Input Processing, " filed Sep. 24, 2019, which may contain information relevant to the present application.

The Examiner's attention is hereby drawn to the specification and file history of co-pending U.S. Appl. No. 16/580,721, titled "Multi-Assistant Natural Language Input Processing To Determine a Voice Model for Synthesized Speech," filed Sep. 24, 2019, which may contain information relevant to the present application.

The Examiner's attention is hereby drawn to the specification and file history of co-pending U.S. Appl. No. 16/580,643, titled "Multi-Assistant Natural Language Input Processing," filed Sep. 24, 2019, which may contain information relevant to the present application.

The Examiner's attention is hereby drawn to the specification and file history of co-pending U.S. Appl. No. 16/781,773, titled "Speech-Processing System," filed Feb. 4, 2020, which may contain information relevant to the present application.

The Examiner's attention is hereby drawn to the specification and file history of co-pending U.S. Appl. No. 17/114,047, titled "Multiple Virtual Assistants," filed Dec. 7, 2020, which may contain information relevant to the present application.

The Examiner's attention is hereby drawn to the specification and file history of co-pending U.S. Appl. No. 17/114,093, titled "Access To Multiple Virtual Assistants," filed Dec. 7, 2020, which may contain information relevant to the present application.

The Examiner's attention is hereby drawn to the specification and file history of co-pending U.S. Appl. No. 17/113,915, titled "Access To Multiple Virtual Assistants," filed Dec. 7, 2020, which may contain information relevant to the present application.

The Examiner's attention is hereby drawn to the specification and file history of co-pending U.S. Patent Application No. 17/217, 148, titled "Assistant Determination in a Skill," filed Mar. 30, 2021, which may contain information relevant to the present application.

International Search Report and Written Opinion dated May 3, 2021 in International Application No. PCT/US2021/014110, 8 pages.

International Preliminary Report on Patentability dated Jun. 24, 2021 in International Application No. PCT/US2019/064434, 8 pages.

International Search Report and Written Opinion dated Dec. 22, 2020 in International Application No. PCT/US2020/051425, 10 pages.

International Search Report and Written Opinion dated Apr. 5, 2022 for International Patent Application No. PCT/US2021/061713.

* cited by examiner

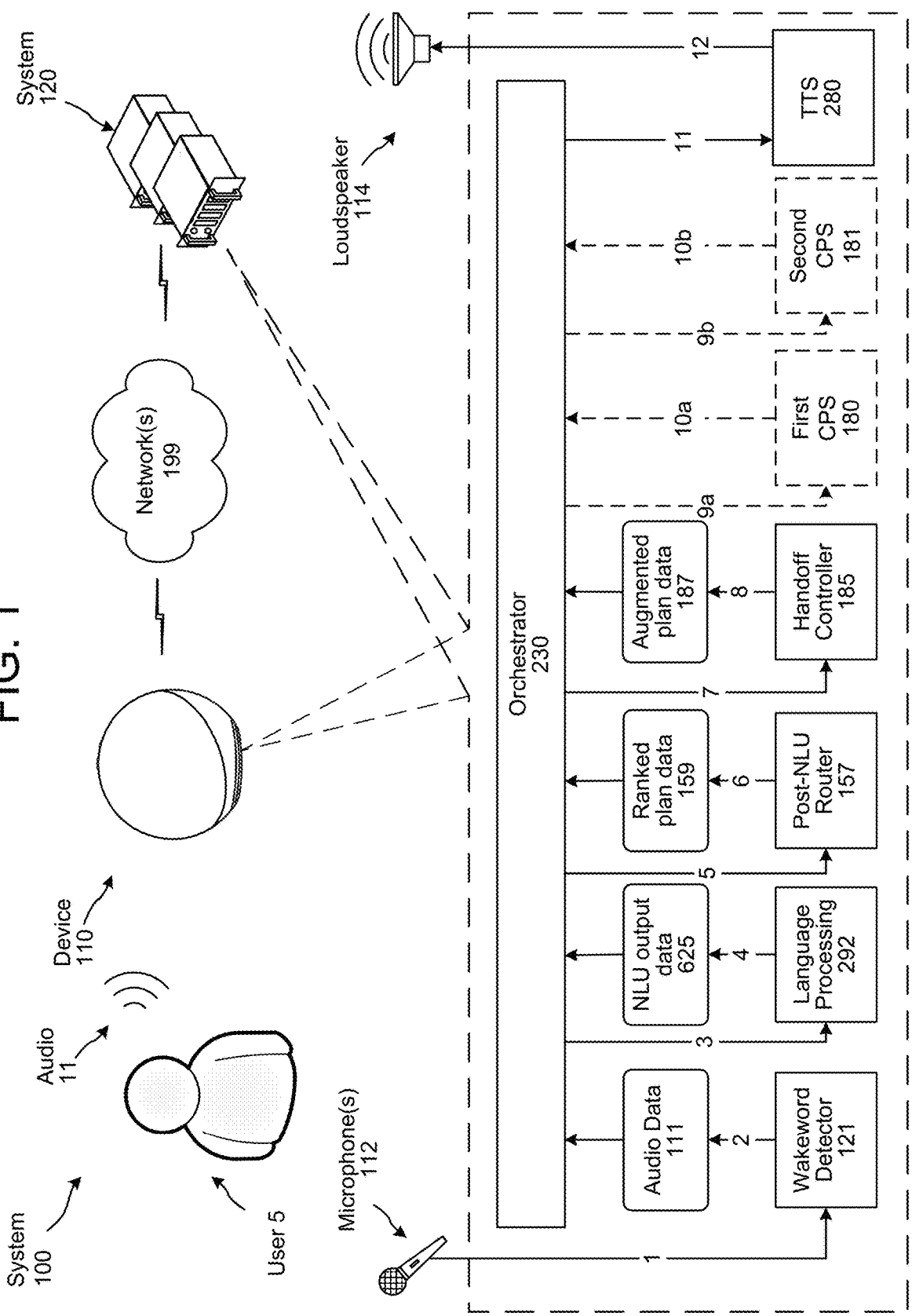

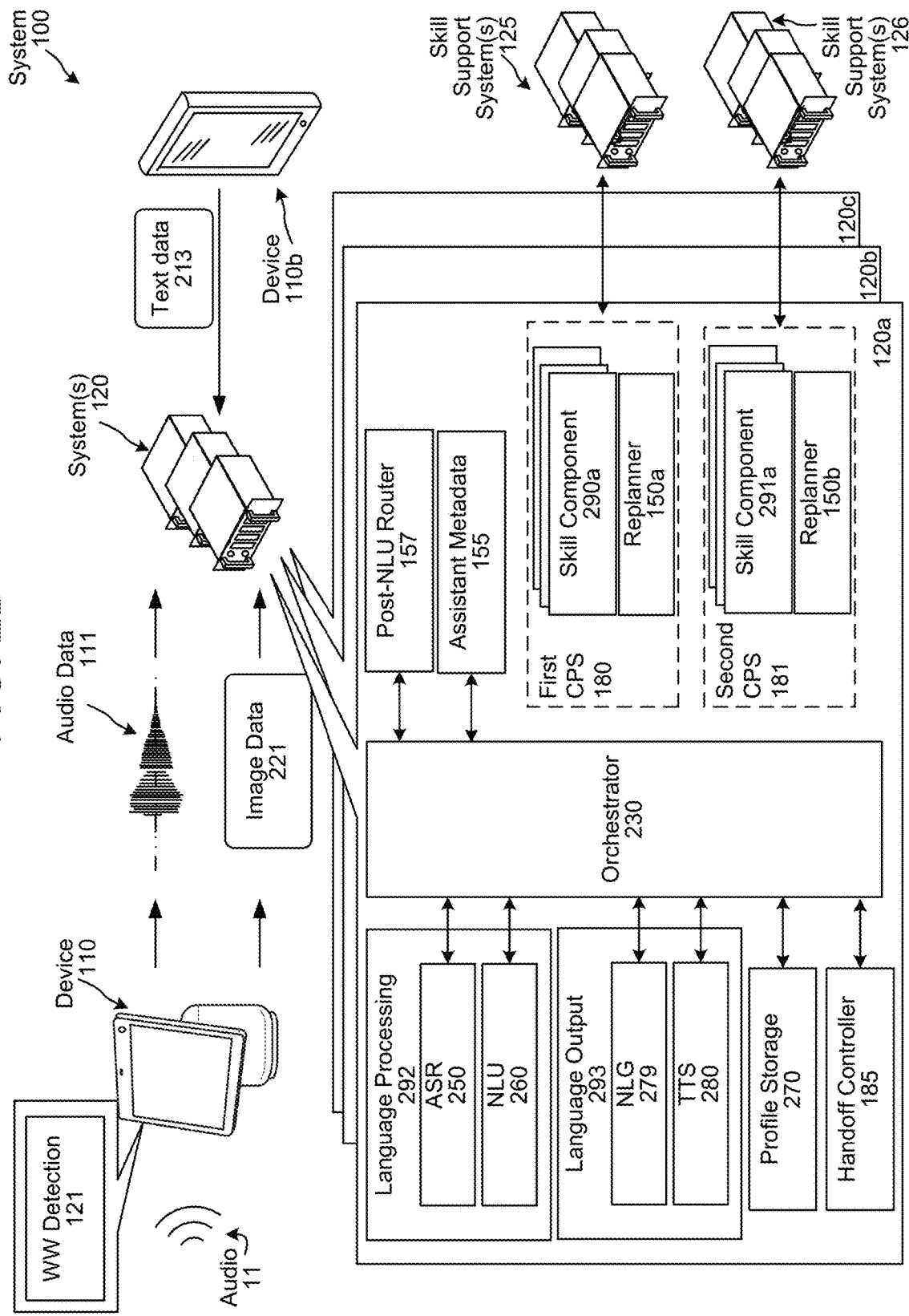

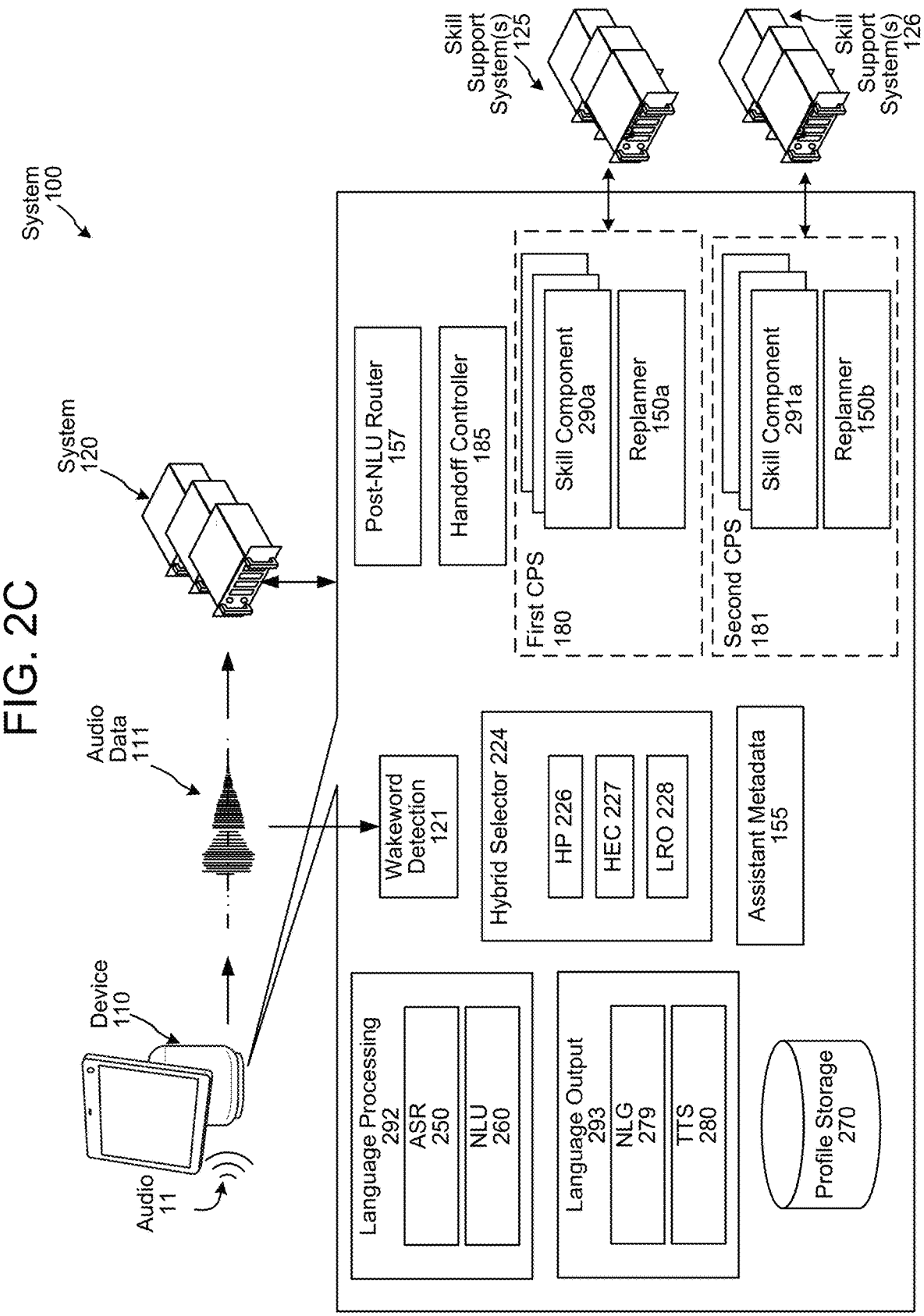

ACCESS TO MULTIPLE VIRTUAL ASSISTANTS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating components of a system allowing interaction with multiple virtual assistants, according to embodiments of the present disclosure.

FIG. 2B is a conceptual diagram illustrating components of the multiple virtual assistant system, according to embodiments of the present disclosure.

FIG. 2C is a conceptual diagram illustrating components that may be included in a device of the multiple virtual assistant system, according to embodiments of the present disclosure.

DETAILED DESCRIPTION

Figure 2A:
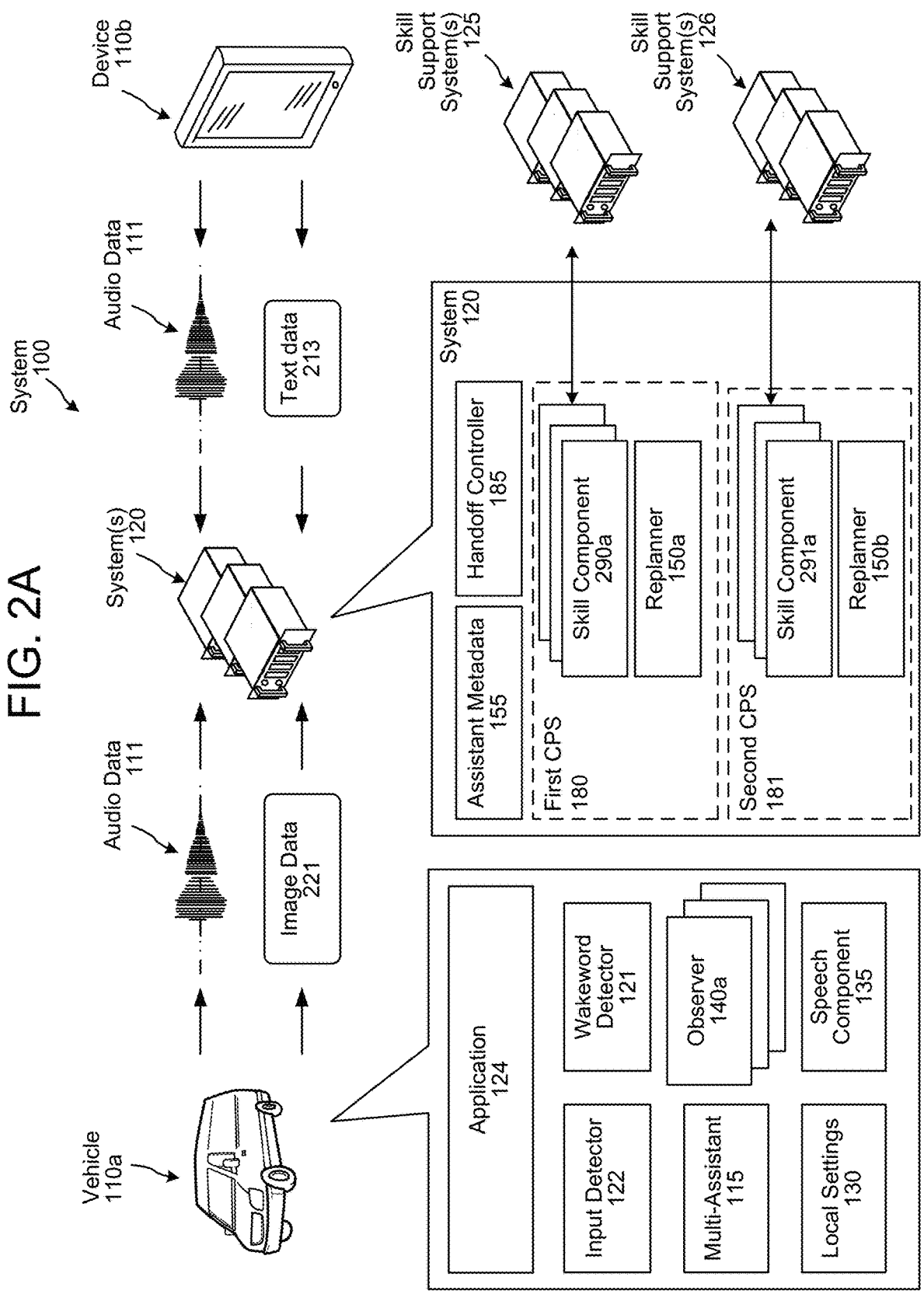
FIG. 2A is a conceptual diagram illustrating components of a device and system for managing and coordinating utterance processing involving multiple command processing subsystems, according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system. The assistant can leverage the speech-processing system as well as additional applications, skills, and/or speechlets to perform tasks for and/or on behalf of the user.

A voice-controlled user device and/or a remote system may be configured to receive a spoken user input and, using ASR, detect a wakeword and/or other text in the user input. The device and/or system may determine a command in the user input using NLU and provide a response to the command using TTS and/or other user interface. In some embodiments, the voice-controlled user device and/or the remote system may be configured to detect a gesture; that is, a non-verbal movement detectable by the device. The voice-controlled user device and/or the remote system may be configured to process a spoken user input received with and/or following the detected gesture. A user may thus control the voice-controlled user device, another user device, and/or the remote system by voice. In some embodiments, in response to the user device detecting the wakeword and/or gesture, the user device may send input data representing the user input to the remote system for further processing. The remote system may further process the input data to verify that it includes a representation of the wakeword and/or to determine the command. The user device may then receive, from the remote device, output audio, video, or other data related to a response to the command and/or other data required to perform an action associated with the response.

A user may be able to interact with more than one assistant using the speech-processing system. Each assistant may be embodied in a respective command processing subsystem (CPS) and described further herein. One assistant may be configured to offer a different user experience than another assistant. Each assistant may be associated with commands and/or responses to those commands unique to that assistant. In one example, a first assistant may be associated with device control (such as control of a vehicle), while another assistant may be associated with general informational commands or queries. In another example, a first assistant may be preferred by a user for online shopping, while a second assistant may be preferred for navigation. A user may thus wish to direct online-shopping commands to the first assistant, and wish to direct navigation commands to the second assistant. A user may invoke a particular assistant with a wakeword and/or gesture (e.g., a non-verbal movement) associated with that assistant. For example, a first assistant may be invoked using the wakeword "Alexa" and a press-and-hold gesture, while a second assistant may be invoked using the wakeword "Hal" and a tap-to-talk gesture. Wakewords and/or gestures may be set by system default and/or may be user-assignable. Each assistant may, in addition to being associated with its own, may be unique, interpretation of commands, provide its own, may be unique responses, and/or otherwise be perceived as having a particular "personality." This personality may include, for example, a particular albeit artificial speaking voice and/or style, such as "newscaster" or "celebrity." An assistant may respond with synthesized speech (generated by, for example, the TTS component) exhibiting aspects (e.g., audio characteristics) corresponding to the personality. Thus one assistant may have a different voice from another assistant. A user may thus come to associate a certain assistant with a certain personality and thus recognize synthesized speech as being associated with a particular assistant by recognizing the personality.

Functions of an assistant may be provided by the speech-processing system via one or more CPSs. Each CPS may include settings and/or resources used by the speech-processing system to provide the functions of the corresponding assistant. In some embodiments, multiple CPSs may share certain resources of the speech-processing system; for example, the ASR component(s), NLU component(s), and/or TTS component(s). In other embodiments, however, each CPS may have its own dedicated ASR component(s), NLU component(s), and/or TTS component(s).

Each CPS may be associated with different back-end applications, speechlets, and/or skills. For example, a first CPS may be associated with a shopping skill and a second CPS may be associated with a vehicle navigation skill. In addition or in the alternative, a first CPS and second CPS may share skills, for example, they may share a navigation skill while only the first CPS has access to a device control skill and only second CPS has access to a shopping skill. In addition or in the alternative, a first CPS and second CPS may have access to different skills that perform the same (or similar) operations. For example, the first CPS may have access to a first navigation skill while the second CPS has access to a second navigation skill. As can be appreciated, many different arrangements of CPS architecture, skill access, settings, etc. may be configured.

Each CPS may be associated with certain settings and/or other data maintained in a respective or shared assistant metadata component. An assistant metadata component may include information regarding functionality of CPSs, such as which CPSs are available with respect to a particular device and/or location, and which commands and/or skills are associated with a CPS. The assistant metadata component may include information regarding user experience (e.g., assistant "personalities"), such as which wakewords and/or gestures are associated with each CPS, light patterns and/or images that give a visual indication of the active CPS, TTS parameters and settings for giving a CPS a distinctive voice, etc. In some implementations, CPS-specific data such as intent and/or entity libraries, etc., may be provided to language processing components to streamline and/or augment language processing, and provide more accurate results.

In some situations, a user may invoke a first assistant for handling a command; for example, using a wakeword and/or a gesture associated with a first CPS. The speech-processing system may determine, however, that the command may be better handled by a second assistant associated with a second CPS. For example, the speech-processing system may determine a skill for executing the command, and further determine that the skill is associated with the second CPS but not the first CPS. The speech-processing system may thus perform a handoff from the first CPS to the second CPS. The speech-processing system may provide indications of the handoff for the purpose of informing the user of the transfer of responsibility from the first assistant to the second assistant. In doing so, the speech-processing system may perform operations corresponding to both the first CPS and the second CPS. This may present technical challenges related to providing outputs according to settings associated with distinct CPSs, the relative timing of the outputs, and routing of the command to the skill for execution.

A speech-processing system may include components such as replanners which may assist in CPS handoff so that utterances that call on one CPS may, in certain circumstances, be handled by a potentially more appropriate CPS. For example, if a user in a car says "Assistant A, roll down my windows" but it is Assistant B that is capable of controlling the car, the system may be able to communicate between a first CPS (for example, for Assistant A) and second CPS (for example, for Assistant B) to coordinate rolling down the windows by Assistant B even though the user invoked Assistant A.

In some situations, however, direct sharing of information (particularly utterance information, user information, assistant information, etc.) between a first CPS and second CPS may not be desired. This may be for a number of reasons. First, a user may have one set of permissions with a first CPS that does not allow sharing of certain data to a second CPS. Further, centralized user settings may not permit sharing of user utterance information to a CPS that was not directly invoked by the user. Thus protection of user privacy may prevent communication between different CPS components. Second, a user may be permitted to interact with a first CPS but not a second CPS, such as when the user is a child and the first CPS is authorized for child use by the second CPS is not. Third, while a first CPS and second CPS may each be invoked from a first device, the systems themselves may not desire to share information directly between them. This may true be in a situation where the first CPS and second CPS have different speech processing architectures/pipelines (as opposed to sharing many speech processing components) such that commands invoking the first CPS go to one set of device(s)/component(s) for processing while commands invoking the second CPS go to a different set of device(s)/component(s) for processing. This may be true in the situation where a first CPS and second CPS are managed by competing entities. Thus it may not be permitted to share information directly between different CPS components.

In situations where information transfer is not permitted the system may return an error message to a user such as replying using a first assistant's voice to say "I'm sorry, I can't handle that." This response may be an undesirable user experience, even if it was required given the technical constraints surrounding processing that specific utterance. As can be appreciated, when a system allows access to many different assistants, each capable of handling hundreds, if not thousands of specific utterances, it may be difficult for the system to manage and coordinate the training of many different assistant-specific replanners. Specifically, it may be difficult for the system to collect feedback and coordinate retraining of such replanners, particularly to avoid undesirable user experiences such as that described above.

For example, in a situation where a first user spoke an utterance invoking a first CPS for a command actually intended for a second CPS, a replanner of the first CPS may determine that a handoff to the second CPS was desired. The first CPS may then attempt handoff to the second CPS, which may result in the first CPS stopping processing with regard to the utterance. But a replanner (or other component) for the second CPS may reject the handoff due to some technical issue between the first CPS and second CPS. In this situation the second CPS may return an error to the user. And this problem may continue replicating itself under similar circumstances because the replanner for the first CPS may not be aware of the technical issue and thus the first CPS may not have the opportunity to retrain/correct the issue, allowing a potentially undesirable user experience to continue. Such a situation may replicate itself many times over given the number of assistants, handoff situations, etc.

The present disclosure therefor offers a speech-processing system that can include one or more centralized components for orchestrating the various operations related to the handoff and command execution. This centralized approach may improve feedback and coordination among CPS components as well as for a more flexible/re-trainable component that can more easily handle updates related to new experiences, assistants, etc. The centralized approach may also allow for more customized customer experiences such as different synthesized speech outputs, physical responses, etc. based on specific circumstances surrounding each handoff. Individual assistant based replanners may only offer certain output options (for example, only one way to indicate to the user that a transfer is not permitted) but centralization of this approach allows for more customized content/output to the user, particularly using the approach described herein. The centralized components may include a component (e.g., a plan determination component 720 discussed in detail below) that uses post-NLU data to determine a plan for execution of the utterance. The component may reside, for example, with other post-NLU components such as with a post-NLU router 157 discussed below. The plan determination component 720 may determine a ranked list of potential plans, each associated with a score. Each plan may include simply instructions to execute an intent by a particular CPS or may include multiple instructions to coordinate handoff between a first CPS and second CPS. The components may also include a component (e.g., a handoff controller 185 discussed in detail below) that can take the plan data and append or fill it with particular data to assist with execution of the plan. Such fill data may include, for example, text determined through assistant-specific natural language generation that may inform the user of the plan being executed, for example a handoff between a first CPS and second CPS. The handoff controller 185 may fill data for each of the plans in the ranked list of plans. The components may also include an orchestrator (e.g., orchestrator 230) which can coordinate actual execution of the top scoring plan, for example by coordinating with the different system components to execute the particular instructions of the plan and, if appropriate, cause the appropriate transfer of data between CPS components and output of response (such as a TTS response) through a user device.

The plan determination component 720 may thus generate plan data representing a list of potential plans that may be used to respond to an input utterance. Each plan may include a sequence of operations for responding to the utterance. Each plan may be different. For example, one plan in the list may call for executing an intent using a requested CPS/assistant. Another plan in the list may call for performing a handoff between a first CPS and second CPS. Still another plan in the list may call for a TTS response in the voice of a first assistant indicating that it cannot handle the utterance. Thus a plan may include user experience operations such as providing verbal or non-verbal output via the device, and command processing operations such as calling a skill to execute with respect to the command. The plan determination component 720 may receive information indicating a requested CPS (e.g., representing the assistant invoked by the user), a skill, an intent, and a selected CPS for handling the skill/intent. The plan determination component 720 may use this data along with policy data to generate plan data including operations for providing indications of a handoff and invoking the selected CPS for executing the command. The policy data may include data indicating how certain utterances should be handled based on the utterance-specific input data (e.g., NLU output data, context data, etc.)

Handoff plan data may include an operation to provide a verbal output based on the settings of the first CPS (that is, in the personality of the first assistant) announcing the handoff. The handoff plan data may not, however, necessarily indicate the text of that particular verbal output. The text of the output may be determined by the handoff controller 185, which may coordinate with the first CPS and second CPS to determine the precise text of the verbal output, such as, in the voice of Alexa: "You asked for Alexa to roll down your windows but I think it's better for Hal to help you with that." The plan data may include an operation to call a skill associated with the second CPS to execute the command. In some implementations, the plan data may additionally select a handoff type. For example, rather than have the first CPS announce the handoff, the plan data may indicate a barge-in handoff type in which the selected CPS rather than the requested CPS announces the handoff. In this situation the handoff controller 185 may take the plan data and fill in the text of the verbal output, such as, in the voice of Hal: "You asked for Alexa to roll down your windows but this is Hal and I can help you with that."

In some implementations, the plan determination component 720 may determine a plan based on the identity of the requested CPS and/or the selected CPS. In some implementations, the plan determination component 720 may determine a plan based on the intent and/or skill. In some implementations, the plan determination component 720 may determine a plan based on user settings and/or a device type of the user device. The plan determination component 720 may comprise a trained model that is used to determine ranked plan data based on policy data and other input data. The plan determination component 720 may also use rules or other computing techniques to determine the plan data.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating components of a device in a virtual assistant system 100 for managing and coordinating a natural language dialog involving multiple command processing subsystems (CPSs), according to embodiments of the present disclosure. The various components may be located on same or different physical devices. Communication between various components may occur directly or across a network(s) 199. The system 100 may include one or more voice-controlled devices 110 in communication with a natural language command processing system 120 (abbreviated "system 120").

As shown a user 5 speaks an utterance represented by audio 11. The device 110 may include a microphone 112 for detecting the receiving an audio signal. The audio is detected (1) by the device 110 though microphone(s) 112, which creates audio data and sends it to the wakeword detector 121. The wakeword detector 121 may determine that audio data corresponding to the audio contains a representation of a wakeword (as described in greater detail below); the device 110 may thereafter send the audio data to the system (s) 120 and/or to further components for speech processing or further operations. An example wakeword is "Alexa." The device 110 may instead or in addition send the audio data to the system(s) 120 when an input detector 122 (shown in FIG. 2A) detects an input—such as a key press, button press, touch-screen touch—corresponding to sending the audio data is detected. An example button is a "Push to Talk" button. The button and/or the input detector 122 may be capable of differentiating gestures such as tap-to-talk, push-and-hold, double-click, etc. In any event, the device 110 receives the audio 11, and sends corresponding input data to the server 120/further components as audio data 111, text data, a phonetic representation of the command, etc. For purposes of illustration in FIG. 1 the components and operations are shown either executed by components of device 110 and/or system 120 however the components may be distributed among many different devices/components according to the system. As described in FIG. 2C, additional language processing and command execution operations can be performed on the device 110, and the disclosure is not limited by whether the device 110 and/or system 120 performs operations described herein.

Once the wakeword is detected by the wakeword detector 121 and/or input is detected by the input detector 122 (shown in FIG. 2A), the device 110 may wake and begin transmitting (2) audio data 111, representing the audio signal, to the system(s) 120; for example, via the speech component 135 (shown in FIG. 2A). The audio data 111 may include data corresponding to the wakeword; in other embodiments, the portion of the audio corresponding to the wakeword is removed by the device 110 prior to sending the audio data 111 to the system(s) 120. In other embodiments metadata is sent with the audio data 111 indicating the assistant invoked by the wakeword and/or by another invoking input (touch input, gesture, etc.) so the system has data indicating the assistant invoked by the user. Other metadata may also accompany/be included in the audio data 111 such as the identity of a user who spoke the utterance (if the device 110 is configured to determine such data), timing of the input audio (for example, time of utterance start, time of utterance completion, utterance duration, etc.), ID of the device 110 that captured the utterance, etc. The audio data 111 and/or metadata may be sent to orchestrator 230 which may coordinate exchange of data between multiple components to handle and respond to the utterance.

The orchestrator 230 may send (3) the audio data 111 and other data to language processing component 292 which, as discussed further below, processes the audio data 111 to determine an interpretation of the utterance, represented by NLU output data 625. The NLU output data 625 may include one or more hypotheses representing machine interpretations of the utterance. The language processing component 292 may send (4) the NLU output data 625 to the orchestrator 230. The orchestrator 230 may then send the NLU output data 625 and other data to a post-NLU router 157. As discussed below in reference to FIG. 7, the post-NLU router 157 may include a plan determination component 720. The plan determination component 720 may then process the NLU output data 625 and other data to determine a ranked list of plans to handle the utterance. The ranked list of plans may be represented by ranked plan data 159. As noted below, the ranked plan data 159 may include data to be used by the system to coordinate a handoff between a first CPS and second CPS. The post-NLU router 157 may send (6) the ranked plan data to the orchestrator 230. The orchestrator 230 may then send the ranked plan data to the handoff controller 185. The handoff controller 185 may process the ranked plan data to fill in data for one or more of the plans represented in the ranked plan data 159. For example, determining output text coordinating a handoff represented in a plan. The handoff controller 185 may determine such fill in data for more than one plan in the ranked plan data. The augmented plan data 187 may include the original plan data along with data added by the handoff controller 185. The handoff controller 185 may send (8) the augmented plan data 187 to the orchestrator 230 which may then execute the top ranked plan in augmented plan data 187. The orchestrator 230 and/or another component may also re-rank the plans represented by the augmented plan data 187 to determine the top ranked plan before execution.

In order to execute the top ranked plan the orchestrator may send (9a) and receive (10a) data from the first CPS 180 and/or may send (9b) and receive (10b) data from the second CPS 181 in order to determine the data necessary for execution of the top ranked plan and cause execution of the same. Eventually, if appropriate, the output data (e.g., text data 1110) reflecting the plan (e.g., a handoff) may be sent (11) to a TTS component 280 which may then determine synthesized speech data (e.g., output audio data 1190) which may be sent (12) to the device 110 and played back through loudspeaker 114. The orchestrator 230 may also cause execution of other operations in the top ranked plan, for example causing a skill to execute an intent associated with the utterance (e.g., represented in NLU output data 625). Further details of these operations are discussed below, particularly in reference to FIGS. 7-9.

FIG. 2A is a conceptual diagram illustrating further components of the virtual assistant system 100. As illustrated, the voice-controlled devices may include, for example, a vehicle 110a and/or a tablet computer 110b. Other devices 110 such as those illustrated in FIG. 14 and described below may be used. As described, the device 110 may include a wakeword detector 121 for detecting one or more wakewords, an input detector 122 for detecting user input such as a gesture (e.g., a button press or touch-screen touch), and one or more applications 124 for receiving input, providing output, and/or changing a state of the device 110.

Although the device 110 may initiate speech processing in response to detection of a wakeword, in the case of touch input detection, the audio data 111 may not include a wakeword. The device 110 may be equipped with a camera for capturing image data 221. The device 110 and/or the system 120 may process the image data 221 for purposes of gesture detection (e.g., when the gesture does not include touching a touch- or force-sensitive component), for user recognition, or for detecting context (e.g., is it day/night). The device 110 may also receive text input (or generate text data 213 based on an input) and transmit the text data 213 to the system 120.

The device 110 may include a multi-assistant component 115. The multi-assistant component 115 can receive and process requests to enable and/or disable a CPS, such as the first CPS 180 and/or the second CPS 181 for handling commands received by the device 110. The multi-assistant component 115 can process changes in assistant settings, such as setting CPS-specific wakewords and/or gestures. The multi-assistant component 115 can distill the settings change request by seeing how the requested setting differs from the current settings state stored in the local settings component 130, update the local settings component 130 with the new settings, transmit the new settings to the system 120, and assign an observer component 140 to the CPS. The multi-assistant component 115 may retrieve eligible CPS information from system 120 to provide the user with a list of assistants that may be eligible for use with the speech-controlled device 110.

The device 110 may include a local settings component 130. The local settings component 130 can be a memory or storage that maintains settings related to the one or more CPSs eligible and/or enabled for the device 110. When the user requests a change to assistant settings, the multi-assistant component 115 can refer to the local settings component 130 to determine how the requested setting change differs from the current settings state stored in the local settings component 130. Following this process of distillation, the multi-assistant component 115 can transmit an indication of one or more assistant settings that have changed to the system 120. The system 120 may include a remote settings storage in, for example, the assistant metadata component 155.

The device 110 may include a speech component 135. The speech component 135 may receive input audio data from the application 124 and forward it to the system 120 for processing. In some implementations, the speech component 135 may include speech and/or language processing components such as those described with respect to the language processing component 292 described below with reference to FIG. 2B and FIG. 2C. In some implementations, the speech component 135 may receive input audio data and send it to the system 120 in its original form; that is, as unprocessed audio data. In some implementations, the speech component 135 may process the audio data and transmit the resulting data in the form of ASR data such as phonemes or text, or NLU data in the form of an intent, entity identifiers, and/or slot data.

The device 110 may include one or more observer components 140a, 140b, and 140c, etc. (collectively "observer components 140"). The multi-assistant component 115 may assign an observer component 140 to each CPS enabled for the device 110. The observer component 140 can monitor the application 124, input detector 122, and/or wakeword detector 121 for invocations of the CPS for which it is assigned. The observer component 140 may notify the system 120 of assistant CPS invocation and provide the system 120 with audio data 111, image data 221, and/or text data 213 associated with the invocation.

The system 120 may include speech processing components including components for ASR, NLU, TTS, etc. as further detailed below with reference to FIG. 2B. The system 120 additionally includes components configured to process commands received in a multi-assistant environment. In particular, the system 120 includes a handoff controller 185, the assistant metadata component 155, a first CPS 180, and a second CPS 181. Each CPS may be associated with its own replanner component 150, which may coordinate with orchestrator 230 (discussed below), assistant metadata component 155, handoff controller 185, etc. to coordinate handoff operations.

The first CPS may be associated with one or more skill components 290a, 290b, and 290c (collectively "skill components 290"), and the second CPS may be associated with one or more skill components 291a, 291b, and 291c (collectively "skill components 291"). The system 120 is not limited to two CPSs, and in some implementations may include many CPSs. In some embodiments, one or more skill components 290 or 291 may be shared between two or more CPSs. In some embodiments, the system 120 may include more or fewer skill components 290 or 291, including skill components for additional CPSs. The skill components 290 and/or 291 may communicate with one or more skill support systems 125 or 126, which may augment the resources of the skill components 290 or 291, respectively.

A CPS 180 and/or 181 may include software and/or logic configured to provide the functions of a virtual assistant to the user. The software and/or logic may exist in shared resources of the system 120 (e.g., memory and/or processors), or in distinct dedicated resources. The CPSs 180 and/or 181 may receive calls and/or other data from the orchestrator component 230 (described further below) and return responses to the orchestrator component 230. The CPSs 180 and/or 181 may also store and retrieve data to/from the assistant metadata component 155, such as settings specific to a CPSs 180 and/or 181 and/or to particular users of the CPSs 180 and/or 181. Data provided by the assistant metadata component 155 may be used by the CPSs 180 and/or 181 to project a "personality" in the form of an identifiable voice and/or visual themes. The CPSs 180 and/or 181 may each operate in conjunction with the skill components 290 and/or 291, respectively. In some operations, for example, a user may invoke the first CPS 180 for handling a command associated with a skill 291 corresponding to the second CPS 181. In some cases, the handoff controller 185 may determine filled in data to be added to a handoff plan for a handoff of the command from the first CPS 180 to the second CPS 181 as described further below.

The handoff controller 185 may be a centralized component of system 120 that receives ranked plan data from a plan determination component 720 as further discussed below. The handoff controller 185 may coordinate with replanner components 150 of the different CPSs, for example replanner 150a, replanner 150b, etc. The replanner components 150 may assist with exchanging information between the handoff controller 185 and other components of a CPS which may assist with operations to fill in plan data to coordinate a handoff and/or user experience related thereto. For example, a handoff controller 185 may receive ranked plan data indicating a handoff between a first CPS and second CPS. The handoff controller 185 may communicate with a replanner 150a of the first CPS to determine (perhaps in conjunction with an NLG 279a of the first CPS) what text would be appropriate to have "spoken" by a first assistant of the first CPS as part of the handoff. The handoff controller 185 may also communicate with a replanner 150b of the second CPS to determine (perhaps in conjunction with an NLG 279b of the second CPS) what text would be appropriate to have "spoken" by a second assistant of the second CPS as part of the handoff.

The assistant metadata component 155 may be a memory or storage configured to store information related to CPSs 180 and 181 provided by the system 120. The assistant metadata component 155 can store information about which CPS[s] is/are available for a given user, device 110, location, etc. The assistant metadata component 155 may store settings for CPSs 180 and 181 including which CPSs 180 or 181 are enabled for a particular user and/or device. The assistant metadata component 155 may store wakeword and/or gesture information associated with assistant CPS 180 or 181 for a given user and/or device 110. In some embodiments, the assistant metadata component 155 may mirror the information stored in the local settings component 130. The assistant metadata component 155 may store ASR, NLU, and/or entity libraries associated with each assistant for use by the system 120 during language processing. The assistant metadata component 155 may also store speech style information for each CPS 180 and 181 for use by a TTS component of the system 120 for providing verbal output in a style recognizable by a user as a personality indicating the identity of the assistant. The assistant metadata component 155 may store information regarding non-verbal indications of the CPS 180 and 181, such as colors, earcons, voice chromes, etc. indicative of the identity of an assistant. The assistant metadata component 155 may also store information related to the capabilities of each particular CPS, such as what skills/intents may be executed using the particular CPS.

The system 100 may operate using various components as described in FIG. 2B. FIG. 2B illustrates various components of the system 120 described with references to FIG. 2A as well as additional components. The various components may be located on same or different physical devices. For example, in some implementations, components of the system 120 may reside in the device 110 or be shared between the device 110 and the system 120 as described below with reference to FIG. 2C. Communication between various components may occur directly or across a network (s) 199 connecting one or more of the devices 110, system 120, and/or skill support systems 125. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 121. The wakeword detection component 121 may be configured to detect various wakewords. In at least some examples, each wakeword may correspond to a name of a different digital assistant corresponding to a different CPS 180 or 181. An example wakeword/digital assistant name is "Alexa." In another example, input to the system may be in form of text data 213, for example as a result of a user typing an input into a user interface of device 110. Other input forms may include indication that the user has pressed a physical or virtual button on device 110, the user has made a gesture, etc. The device 110 may also capture images using camera(s) 1518 of the device 110 and may send image data 221 representing those image(s) to the system 120. The image data 221 may include raw image data or image data processed by the device 110 before sending to the system 120.

The wakeword detector 121 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 121 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMIVIs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 121 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 121 and/or input is detected by an input detector, the device 110 may "wake" and begin transmitting audio data 111, representing the audio 11, to the system(s) 120. The audio data 111 may include data corresponding to the wakeword; in other embodiments, the portion of the audio corresponding to the wakeword is removed by the device 110 prior to sending the audio data 111 to the system(s) 120. In the case of touch input detection or gesture based input detection, the audio data may not include a wakeword.

The input detector 122 of the device 110 may detect user input such as a gesture (e.g., a button press or touch-screen touch). An example button is a "Push to Talk" button. The device 110 may send the audio data 111 captured after gesture detection to the system(s) 120. The button and/or the input detector 122 may be capable of differentiating gestures such as tap-to-talk, push-and-hold, double-click, etc. In any event, the device 110 sends the audio data 111 or data representing the received audio 11 and/or commands conveyed therein to the server 120.

In some implementations, the system 100 may include more than one system 120. The systems 120 may respond to different wakewords and/or gestures, and/or perform different categories of tasks. Each system 120 may be associated with its own wakeword such that speaking a certain wakeword results in audio data be sent to and processed by a particular system. For example, detection of the wakeword "Alexa" by the wakeword detector 121 may result in sending audio data to system 120a for processing while detection of the wakeword "Hal" by the wakeword detector 121 may result in sending audio data to system 120b for processing.

In some implementations, the system 100 may include more than one CPS 180 and 181, each representing a virtual assistant having a different "personality" and abilities to provide different services and/or access to different skills. Each CPS 180 or 181 may be invoked by a different wakeword and/or gesture. The system 100 may have a separate wakeword and system for different skills/systems (e.g., "Dungeon Master" for a game play skill/system 120c) and/or such skills/systems may be coordinated by one or more skill(s) 290 of one or more systems 120.

Upon receipt by the system(s) 120, the audio data 111 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 111 to a language processing component 292. The language processing component 292 (sometimes also referred to as a spoken language understanding (SLU) component) includes an automatic speech recognition (ASR) component 250 and a natural language understanding (NLU) component 260. The ASR component 250 may transcribe the audio data 111 into text data. The text data output by the ASR component 250 represents one or more than one (e.g., in the form of an N-best list) ASR hypotheses representing speech represented in the audio data 111. The ASR component 250 interprets the speech in the audio data 111 based on a similarity between the audio data 111 and pre-established language models. For example, the ASR component 250 may compare the audio data 111 with models for sounds (e.g., acoustic units such as phonemes, senons, phones, etc.) and sequences of sounds to identify words that match the sequence of sounds of the speech represented in the audio data 111. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein. The ASR component 250 is described in greater detail below with regard to FIG. 4.

The speech processing system 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the system(s) 120, a skill component 290, a skill system(s) 225, etc.) to execute the intent. For example, if the text data corresponds to "play the $5^{th}$ Symphony by Beethoven," the NLU component 260 may determine an intent that the system output music and may identify "Beethoven" as an artist/composer and "5th Symphony" as the piece of music to be played. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5. However, if the NLU component 260 is unable to resolve the entity—for example, because the entity is referred to by anaphora such as "this song" or "my next appointment"—the speech processing system 292 can send a decode request to another speech processing system 292 for information regarding the entity mention and/or other context related to the utterance. The speech processing system 292 may augment, correct, or base results data upon the audio data 111 as well as any data received from the other speech processing system 292.

In some implementations, the NLU component 260 and/or the ASR component 250 may leverage models, grammars, lexicons, and/or other libraries of data for use in processing natural language inputs. Performance of the system 100 may be improved through use of libraries specific to the virtual assistants available via the system or currently enabled for a particular user/device 110 providing the natural language input. Upon receiving input data related to a natural language input, the system 120 may retrieve a list of enabled and/or available CPSs 180 and 181, e.g., from the profile storage 270 and/or the assistant metadata component 155, and process the natural language input based on libraries associated with the assistants present in the list(s).

The NLU component 260 may return NLU results data 685/625 (which may include tagged text data, indicators of intent, etc.) back to the orchestrator 230. The orchestrator 230 may forward the NLU results data to a skill component (s) 290. If the NLU results data includes a single NLU hypothesis representing a skill associated with the CPS 180 or 181 corresponding to the assistant invoked by the user command, the NLU component 260 and the orchestrator component 230 may direct the NLU results data to the skill component(s) 290 associated with the NLU hypothesis. If the NLU results data 685/625 includes an N-best list of NLU hypotheses, the NLU component 260 and the orchestrator component 230 may direct the top scoring NLU hypothesis to a skill component(s) 290 associated with the top scoring NLU hypothesis. The system may also include a post-NLU router 157 which may perform various operations to assist with processing the input audio, including determining a plan for processing as described herein. As described below, the post-NLU router 157 may include a post-NLU ranker 265 which may incorporate other information to rank potential interpretations determined by the NLU component 260 and/or other components. The local device 110 may also include its own post-NLU router 265. The NLU component 260, post-NLU ranker 265 and other components are described in greater detail below with regard to FIGS. 5-7.

A skill component may be software running on the system(s) 120 that is akin to a software application. That is, a skill component 290 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 290. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 290 may operate in conjunction between the system(s) 120 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill support system(s) 125 may communicate with a skill component(s) 290 within the system(s) 120 and/or directly with the orchestrator component 230 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 290 dedicated to interacting with the skill support system(s) 125. Unless expressly stated otherwise, reference to a skill, skill device, or skill component may include a skill component 290 operated by the system(s) 120 and/or skill operated by the skill support system(s) 125. Moreover, the functionality described herein as a skill or skill may be referred to using many different terms, such as an action, bot, app, or the like. The skill 290 and or skill support system(s) 125 may return output data to the orchestrator 230.

Skills 290 and 291 may be associated with a particular CPS 180 or 181. In some cases, the system 120 may determine that assistant CPS 180 or 181 other than the CPS 180 or 181 invoked by the input data (e.g., indicated by a wakeword and/or gesture received with input audio data) is better able to handle a request or command represented in the input data. For example, the input data may indicate an intent corresponding to a skill that is not enabled for the requested CPS. In such cases, the orchestrator component 230 may provide the NLU result data along with the requested assistant to the replanner component 150. The replanner component 150 may determine that the requested assistant (e.g., corresponding to CPS 180) does not match the selected assistant (e.g., corresponding to CPS 181) for handling the skill/intent indicated by the NLU result data. Accordingly, the replanner component 150 may generate plan data indicating additional operations the system 120 may take with respect to the input data. The replanner component 150 may return the plan data to the orchestrator component 230 for further processing.

The system 120 includes a language output component 293. The language output component 293 includes a natural language generation (NLG) component 279 and a text-to-speech (TTS) component 280. The NLG component 279 can generate text for purposes of TTS output to a user. For example the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280 (e.g., output text data 1410 discussed below). Alternatively or in addition, the TTS component 280 may receive text data from a skill 290 or other system component for output.

The NLG component 279 may include a trained model. The NLG component 279 generates text data 1410 from dialog data received by the dialog manager 272 such that the output text data 1410 has a natural feel and, in some embodiments, includes words and/or phrases specifically formatted for a requesting individual. The NLG may use templates to formulate responses. And/or the NLG system may include models trained from the various templates for forming the output text data 1410. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 290, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

In some cases, the system 100 may provide access to multiple assistants via the CPSs 180 and 181 of the device 110 and/or the system 120. Each assistant may have its own personality as reflected in particular speech style. The language output component 293 may therefore provide different synthesized speech depending on the corresponding CPS 180 or 181. The language output component 293 may receive assistant metadata from the orchestrator 230, skill 290/91, and/or the replanner component 150, etc. The language output component 293 may retrieve speech style data for the CPS 180 or 181 corresponding to the active assistant from the assistant metadata component 155. The language output component 293 may use the speech style data to generate synthesized speech matching the personality of the active assistant.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier/user profile identifier. Each user profile may include various user identifying data. Each user profile may also include data corresponding to preferences of the user. For example, each user profile may include a list of assistants enabled for the user with respect to a given device. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 2B may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 2C illustrates such a configured device 110.

In at least some embodiments, the system 120 may receive the audio data 111 from the device 110, to recognize speech corresponding to a spoken input in the received audio data 111, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 280) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2B, the device 110 may include a wakeword detection component 121 configured to compare the audio data 111 to stored models used to detect a wakeword (e.g., "Alexa") that indicates to the device 110 that the audio data 111 is to be processed for determining NLU output data (e.g., slot data that corresponds to a named entity, label data, and/or intent data, etc.). In at least some embodiments, a hybrid selector 224, of the device 110, may send the audio data 111 to the wakeword detection component 121. If the wakeword detection component 121 detects a wakeword in the audio data 111, the wakeword detection component 121 may send an indication of such detection to the hybrid selector 224. In response to receiving the indication, the hybrid selector 224 may send the audio data 111 to the system 120 and/or the ASR component 250. The wakeword detection component 121 may also send an indication, to the hybrid selector 224, representing a wakeword was not detected. In response to receiving such an indication, the hybrid selector 224 may refrain from sending the audio data 111 to the system 120, and may prevent the ASR component 250 from further processing the audio data 111. In this situation, the audio data 111 can be discarded.

The device 110 may conduct its own speech processing using on-device language processing components, such as an SLU/language processing component 292 (which may include an ASR component 250 and an NLU 260), similar to the manner discussed herein with respect to the SLU component 292 (or ASR component 250 and the NLU component 260) of the system 120. The device 110 may also internally include, or otherwise have access to, other components such as one or more skill components 290 capable of executing commands based on NLU output data or other results determined by the device 110/system 120 (which may operate similarly to skill components 290), profile storage 270 (configured to store similar profile data to that discussed herein with respect to the profile storage 270 of the system 120), or other components. In at least some embodiments, the profile storage 270 may only store profile data for a user or group of users specifically associated with the device 110. The device 110 may also have its own language output component 293 which may include NLG component 279 and TTS component 280.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 224, of the device 110, may include a hybrid proxy (HP) 226 configured to proxy traffic to/from the system 120. For example, the HP 226 may be configured to send messages to/from a hybrid execution controller (HEC) 227 of the hybrid selector 224. For example, command/directive data received from the system 120 can be sent to the HEC 227 using the HP 226. The HP 226 may also be configured to allow the audio data 111 to pass to the system 120 while also receiving (e.g., intercepting) this audio data 111 and sending the audio data 111 to the HEC 227.

In at least some embodiments, the hybrid selector 224 may further include a local request orchestrator (LRO) 228 configured to notify the ASR component 250 about the availability of new audio data 111 that represents user speech, and to otherwise initiate the operations of local language processing when new audio data 111 becomes available. In general, the hybrid selector 224 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 111 is received, the HP 226 may allow the audio data 111 to pass through to the system 120 and the HP 226 may also input the audio data 111 to the on-device ASR component 250 by routing the audio data 111 through the HEC 227 of the hybrid selector 224, whereby the LRO 228 notifies the ASR component 250 of the audio data 111. At this point, the hybrid selector 224 may wait for response data from either or both of the system 120 or the local language processing components. However, the disclosure is not limited thereto, and in some examples the hybrid selector 224 may send the audio data 111 only to the local ASR component 250 without departing from the disclosure. For example, the device 110 may process the audio data 111 locally without sending the audio data 111 to the system 120.

The local ASR component 250 is configured to receive the audio data 111 from the hybrid selector 224, and to recognize speech in the audio data 111, and the local NLU component 260 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 260) may be selected as usable to respond to a natural language user input, and local response data may be sent (e.g., local NLU output data, local knowledge base information, internet search results, and/or local directive data) to the hybrid selector 224, such as a "ReadyToExecute" response. The hybrid selector 224 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 111 to the system 120, and the response data from the system 120 may include the unique identifier to identify which natural language user input the response data corresponds.

In at least some embodiments, the device 110 may include, or be configured to use, one or more skill components 290 that may work similarly to the skill component(s) 290 implemented by the system 120. The skill component(s) 290 may correspond to one or more domains that are used in order to determine how to act on a spoken input in a particular way, such as by outputting a directive that corresponds to the determined intent, and which can be processed to implement the desired operation. The skill component(s) 290 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125/126. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 290, a skill system 125, or a combination of a skill component 290 and a corresponding skill system 125.

Similar to the manner discussed with regard to FIG. 2B, the local device 110 may be configured to recognize multiple different wakewords and/or perform different categories of tasks depending on the wakeword. Such different wakewords may invoke different processing components of local device 110 (not illustrated in FIG. 2C). For example, detection of the wakeword "Alexa" by the wakeword detector 121 may result in sending audio data to certain language processing components 292/skills 290 for processing while detection of the wakeword "Computer" by the wakeword detector 121 may result in sending audio data different language processing components 292/skills 290 for processing.

Figure 3:
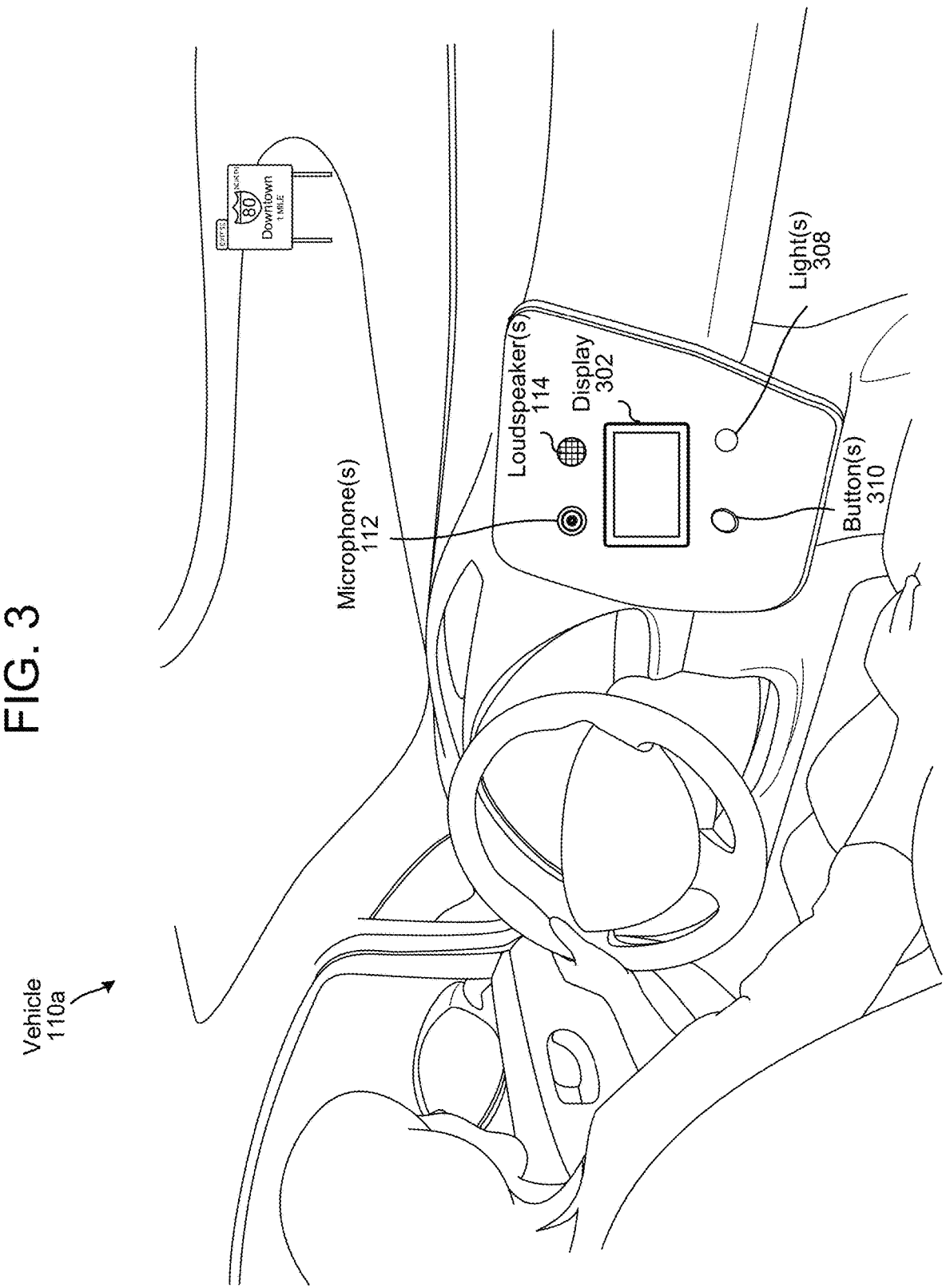
FIG. 3 illustrates a vehicle-based user interface according to embodiments of the present disclosure.

FIG. 3 illustrates a vehicle-based user interface according to embodiments of the present disclosure. FIG. 3 illustrates an interior of the vehicle 110a. The vehicle 110a may include, on a dashboard, steering wheel, heads-up display, or other interior surface or feature, such as a display 302, which may be a touchscreen display. The vehicle 110a may further include one or more microphones 112, which may be used to receive audio that includes an utterance and generate corresponding input audio data. One or more loudspeakers 114 may be used to output audio corresponding to output audio data, which may be received from the system 120. One or more lights 308 may be used to display information; in some embodiments, the lights 308 are used to identify a speech processing system being used to provide output audio and/or perform a task. For example, one light 308 may be illuminated when a first speech processing system is being used to output audio and/or perform an action, and a second light 308 may be illuminated when a second speech processing system is being used. In another example, a light 308 is illuminated using a first color (e.g., blue) when a first speech processing system is being used, and same light 308 is illuminated using a second color (e.g., green) when a second speech processing system is being used. The vehicle 110a may further include one or more buttons 310, dials, switches, triggers, or other such user-input devices. In some embodiments, when the vehicle 110a detects activation of a button 310 and/or touching of the display 302, the microphone 112 captures audio, and the vehicle 110 sends corresponding audio data to the system 120. The vehicle 110a may invoke different assistants depending on the manner of button activation; for example, a tap-to-talk may invoke a first CPS 180 and a press-and-hold may invoke a second CPS 181. In other embodiments, the vehicle 110a continually receives audio data captured by the microphone 112 and sends corresponding audio data to the system 120 when the vehicle 110a detects a wakeword in the audio data (as described in greater detail below).

Figure 4:
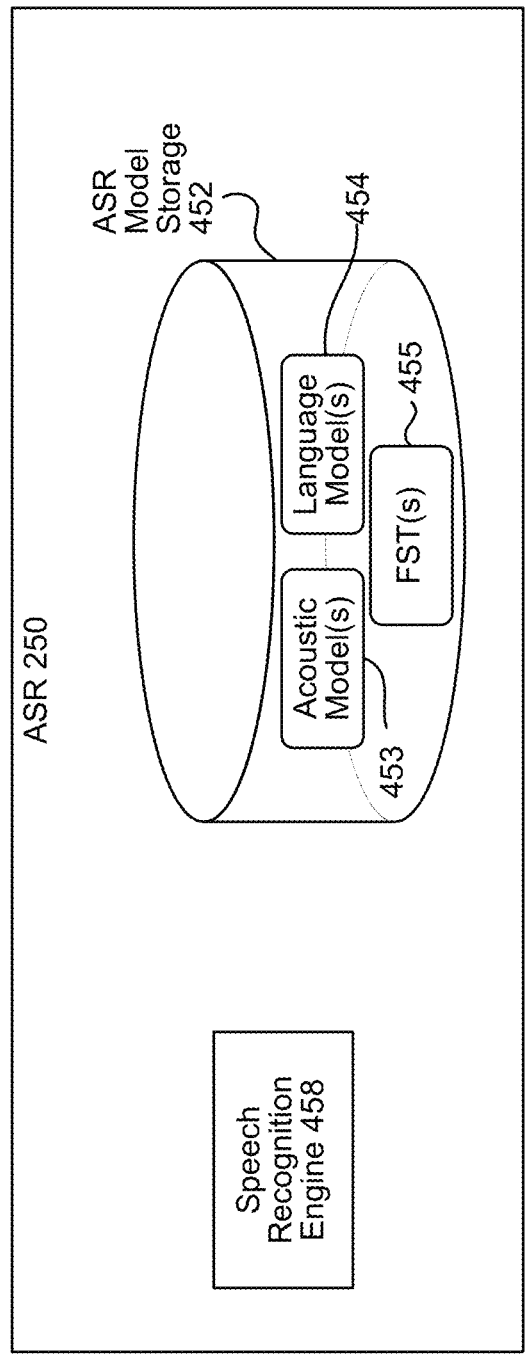
FIG. 4 is a conceptual diagram of an automatic speech recognition component, according to embodiments of the present disclosure.

FIG. 4 is a conceptual diagram of an ASR component 250, according to embodiments of the present disclosure. The ASR component 250 may interpret a spoken natural language input based on the similarity between the spoken natural language input and pre-established language models 454 stored in an ASR model storage 452. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 455 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 453 stored in the ASR model storage 452), and the likelihood that a particular word, which matches the sounds, would be included in the sentence at the specific location (e.g., using a language or grammar model 454). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 458. The ASR component 250 receives audio data 111 (for example, received from a local device 110 having processed audio detected by a microphone by an acoustic front end (AFE) or other component). The speech recognition engine 458 compares the audio data 111 with acoustic models 453, language models 454, FST(s) 455, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 458 may process the audio data 111 with reference to information stored in the ASR model storage 42. Feature vectors of the audio data 111 may arrive at the system 120 encoded, in which case they may be decoded prior to processing by the speech recognition engine 458.

The speech recognition engine 258 attempts to match received feature vectors to language acoustic units (e.g., phonemes) and words as known in the stored acoustic models 453, language models 2B54, and FST(s) 455. For example, audio data 111 may be processed by one or more acoustic model(s) 453 to determine acoustic unit data. The acoustic unit data may include indicators of acoustic units detected in the audio data 111 by the ASR component 250. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 454 (and/or using FST 455) to determine ASR data 610. The ASR data 610 can include one or more hypotheses. One or more of the hypotheses represented in the ASR data 610 may then be sent to further components (such as the NLU component 260) for further processing as discussed herein. The ASR data 610 may include representations of text of an utterance, such as words, subword units, or the like.

The speech recognition engine 458 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 458 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 458 may use the acoustic model(s) 253 to attempt to match received audio feature vectors to words or subword acoustic units. An acoustic unit may be a senone, phoneme, phoneme in context, syllable, part of a syllable, syllable in context, or any other such portion of a word. The speech recognition engine 458 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 458 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 458, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 458 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L 0", "H A L 0", and "Y E L 0" may be adjusted by a language model to adjust the recognition scores of "H E L O" (interpreted as the word "hello"), "H A L 0" (interpreted as the word "halo"), and "Y E L O" (interpreted as the word "yellow") based on the language context of each word within the spoken utterance.

In some implementations, the ASR component 250 may load different and/or additional acoustic models 453, FSTs 455, and/or language models 454 depending on a context associated with the received audio data 111. For example, the ASR component 250 may load different models depending on a user, device, device type, etc., associated with the audio data 111. In some implementations, the ASR component 250 may load models associated with assistants eligible and/or available for handling commands received from the device 110. Leveraging assistant-specific models may improve the quality of ASR result data and/or reduce the computational load of ASR processing.

Figure 5:
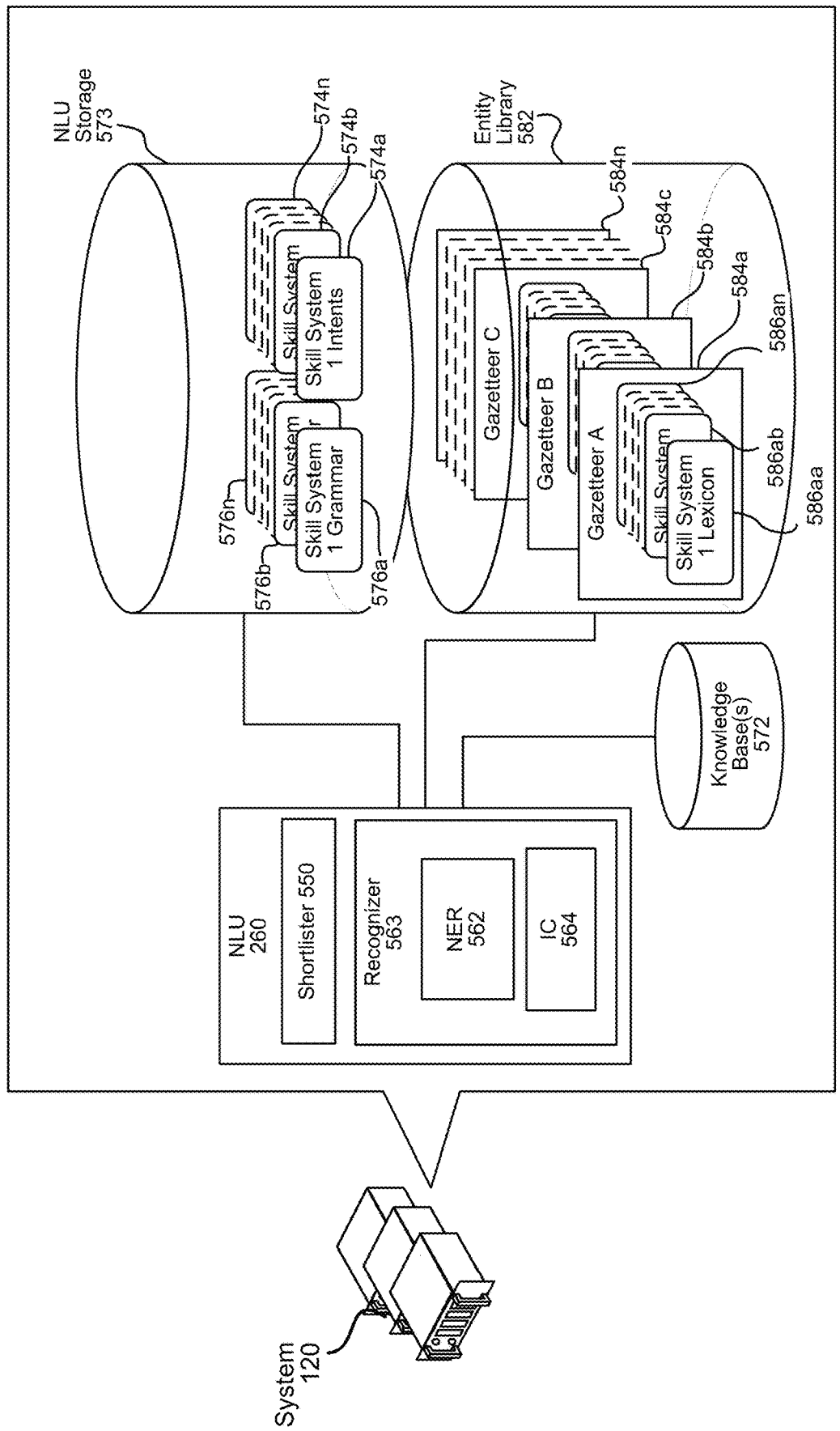
FIG. 5 is a conceptual diagram of how natural language processing is performed, according to embodiments of the present disclosure.
Figure 6:
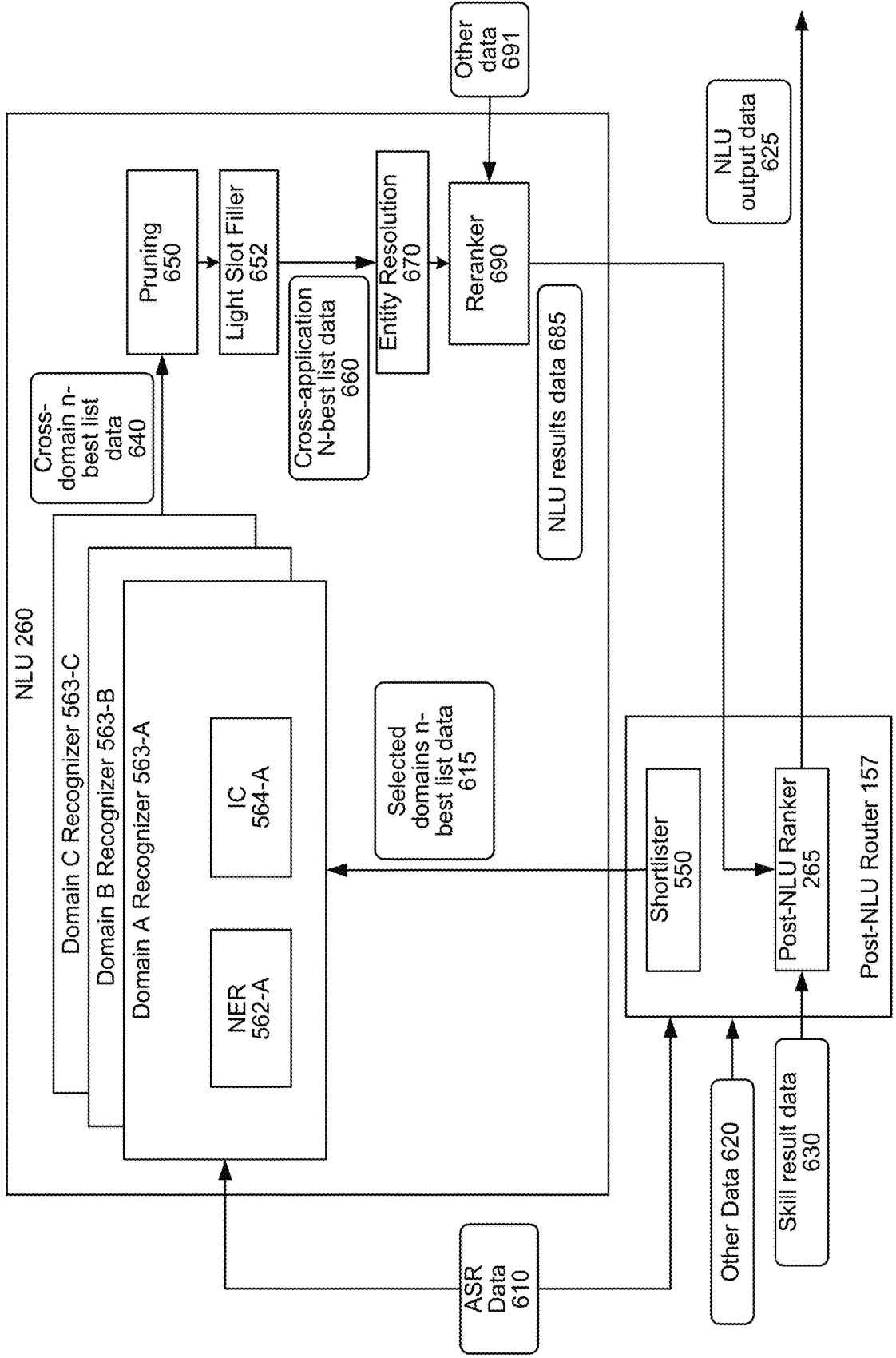
FIG. 6 is a conceptual diagram of how natural language processing is performed, according to embodiments of the present disclosure.

FIGS. 5 and 6 illustrates how the NLU component 260 may perform NLU processing. FIG. 5 is a conceptual diagram of how natural language processing is performed, according to embodiments of the present disclosure. And FIG. 6 is a conceptual diagram of how natural language processing is performed, according to embodiments of the present disclosure.

FIG. 5 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may leverage libraries of data related to intents, slot data, and/or entities. For example, the NLU component 260 may reference NLU storage 571 and entity library 582. The NLU storage 573 may contain skill system grammars 576 and skill system intents 574. The entity library 582 may include gazetteers 584, each associated skill system lexicons 586. The NLU component 260 may process ASR hypotheses based on the information in these various data. In some implementations, the NLU component 260 may add or remove portions of this various data depending on a list of assistants eligible and/or available for handling a given input. For example, different skill systems and/or intents may be relevant depending on which assistants are enabled for use with the device 110. Additionally or alternatively, a reranker or a post-NLU ranker (e.g., the reranker 690 and/or post-NLU ranker 265 discussed below) may take into account assistant information when ranking NLU hypotheses. The post-NLU ranker 265 may be included in another component such as a post-NLU router 157.

The NLU component 260 and/or post-NLU router 157 may include a shortlister component 550. The shortlister component 550 selects skills that may execute with respect to ASR output data 610 input to the NLU component 260 (e.g., applications that may execute with respect to the user input). The ASR output data 610 (which may also be referred to as ASR data 610) may include representations of text of an utterance, such as words, subword units, or the like. The shortlister component 550 thus limits downstream, more resource intensive NLU processes to being performed with respect to skills that may execute with respect to the user input.

Without a shortlister component 550, the NLU component 260 may process ASR output data 610 input thereto with respect to every skill of the system, either in parallel, in series, or using some combination thereof. By implementing a shortlister component 550, the NLU component 260 may process ASR output data 610 with respect to only the skills that may execute with respect to the user input. This reduces total compute power and latency attributed to NLU processing.

The shortlister component 550 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 550 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 550 may be trained with respect to a different skill. Alternatively, the shortlister component 550 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 550. For example, some sample user inputs may be positive examples (e.g., user inputs that may be used to invoke the skill). Other sample user inputs may be negative examples (e.g., user inputs that may not be used to invoke the skill).

As described above, the shortlister component 550 may include a different trained model for each skill of the system, a different trained model for each domain, or some other combination of trained model(s). For example, the shortlister component 550 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 550 to output indications of only a portion of the skills that the ASR output data 610 may relate to. For example, a user input may correspond to "tell me about Tom Collins." If the model is clustered based on domain, the shortlister component 550 may determine the user input corresponds to a recipe skill (e.g., a drink recipe) even though the user input may also correspond to an information skill (e.g., including information about a person named Tom Collins).

The NLU component 260 may include one or more recognizers 563. In at least some embodiments, a recognizer 563 may be associated with a skill system 125 (e.g., the recognizer may be configured to interpret text data to correspond to the skill system 125). In at least some other examples, a recognizer 563 may be associated with a domain such as smart home, video, music, weather, custom, etc. (e.g., the recognizer may be configured to interpret text data to correspond to the domain).

If the shortlister component 550 determines ASR output data 610 is potentially associated with multiple domains, the recognizers 563 associated with the domains may process the ASR output data 610, while recognizers 563 not indicated in the shortlister component 550's output may not process the ASR output data 610. The "shortlisted" recognizers 563 may process the ASR output data 610 in parallel, in series, partially in parallel, etc. For example, if ASR output data 610 potentially relates to both a communications domain and a music domain, a recognizer associated with the communications domain may process the ASR output data 610 in parallel, or partially in parallel, with a recognizer associated with the music domain processing the ASR output data 610.

Each recognizer 563 may include a named entity recognition (NER) component 562. The NER component 562 attempts to identify grammars and lexical information that may be used to construe meaning with respect to text data input therein. The NER component 562 identifies portions of text data that correspond to a named entity associated with a domain, associated with the recognizer 563 implementing the NER component 562. The NER component 562 (or other component of the NLU component 260) may also determine whether a word refers to an entity whose identity is not explicitly mentioned in the text data, for example "him," "her," "it" or other anaphora, exophora, or the like.

Each recognizer 563, and more specifically each NER component 562, may be associated with a particular grammar database 576, a particular set of intents/actions 574, and a particular personalized lexicon 586. Each gazetteer 584 may include domain/skill-indexed lexical information associated with a particular user and/or device 110. For example, a Gazetteer A (584a) includes skill-indexed lexical information 586aa to 586an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 562 applies grammar information 576 and lexical information 586 associated with a domain (associated with the recognizer 563 implementing the NER component 562) to determine a mention of one or more entities in text data. In this manner, the NER component 562 identifies "slots" (each corresponding to one or more particular words in text data) that may be useful for later processing. The NER component 562 may also label each slot with a type (e.g., noun, place, city, artist name, song name, etc.).

Each grammar database 576 includes the names of entities (i.e., nouns) commonly found in speech about the particular domain to which the grammar database 576 relates, whereas the lexical information 586 is personalized to the user and/or the device 110 from which the user input originated. For example, a grammar database 576 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (584a-584n) stored in an entity library storage 582. The gazetteer information 584 may be used to match text data (representing a portion of the user input) with text data representing known entities, such as song titles, contact names, etc. Gazetteers 584 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 563 may also include an intent classification (IC) component 564. An IC component 564 parses text data to determine an intent(s) (associated with the domain associated with the recognizer 563 implementing the IC component 564) that potentially represents the user input. An intent represents to an action a user desires be performed. An IC component 564 may communicate with a database 574 of words linked to intents. For example, a music intent database may link words and phrases such as "quiet," "volume off," and "mute" to a <Mute> intent. An IC component 564 identifies potential intents by comparing words and phrases in text data (representing at least a portion of the user input) to the words and phrases in an intents database 574 (associated with the domain that is associated with the recognizer 563 implementing the IC component 564).

The intents identifiable by a specific IC component 564 are linked to domain-specific (i.e., the domain associated with the recognizer 563 implementing the IC component 564) grammar frameworks 576 with "slots" to be filled. Each slot of a grammar framework 576 corresponds to a portion of text data that the system believes corresponds to an entity. For example, a grammar framework 576 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 576 may not be structured as sentences, but rather based on associating slots with grammatical tags.

For example, an NER component 562 may parse text data to identify words as subject, object, verb, preposition, etc. based on grammar rules and/or models prior to recognizing named entities in the text data. An IC component 564 (implemented by the same recognizer 563 as the NER component 562) may use the identified verb to identify an intent. The NER component 562 may then determine a grammar model 576 associated with the identified intent. For example, a grammar model 576 for an intent corresponding to <PlayMusic> may specify a list of slots applicable to play the identified "object" and any object modifier (e.g., a prepositional phrase), such as {Artist Name}, {Album Name}, {Song name}, etc. The NER component 562 may then search corresponding fields in a lexicon 586 (associated with the domain associated with the recognizer 563 implementing the NER component 562), attempting to match words and phrases in text data the NER component 562 previously tagged as a grammatical object or object modifier with those identified in the lexicon 586.

An NER component 562 may perform semantic tagging, which is the labeling of a word or combination of words according to their type/semantic meaning. An NER component 562 may parse text data using heuristic grammar rules, or a model may be constructed using techniques such as Hidden Markov Models, maximum entropy models, log linear models, conditional random fields (CRF), and the like. For example, an NER component 562 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 562 identifies "Play" as a verb based on a word database associated with the music domain, which an IC component 564 (also implemented by the music domain recognizer) may determine corresponds to a <PlayMusic> intent. At this stage, no determination has been made as to the meaning of "mother's little helper" or "the rolling stones," but based on grammar rules and models, the NER component 562 has determined the text of these phrases relates to the grammatical object (i.e., entity) of the user input represented in the text data.

An NER component 562 may tag text data to attribute meaning thereto. For example, an NER component 562 may tag "play mother's little helper by the rolling stones" as: {domain} Music, {intent}<PlayMusic>, {artist name} rolling stones, {media type} SONG, and {song title} mother's little helper. For further example, the NER component 562 may tag "play songs by the rolling stones" as: {domain} Music, {intent}<PlayMusic>, {artist name} rolling stones, and {media type} SONG.

The shortlister component 550 may receive ASR output data 610 output from the ASR component 250 or output from the device 110b (as illustrated in FIG. 6). The ASR component 250 may embed the ASR output data 610 into a form processable by a trained model(s) using sentence embedding techniques as known in the art. Sentence embedding results in the ASR output data 610 including text in a structure that enables the trained models of the shortlister component 650 to operate on the ASR output data 610. For example, an embedding of the ASR output data 610 may be a vector representation of the ASR output data 610.

The shortlister component 550 may make binary determinations (e.g., yes or no) regarding which domains relate to the ASR output data 610. The shortlister component 550 may make such determinations using the one or more trained models described herein above. If the shortlister component 550 implements a single trained model for each domain, the shortlister component 550 may simply run the models that are associated with enabled domains as indicated in a user profile associated with the device 110 and/or user that originated the user input.

The shortlister component 550 may generate n-best list data 615 representing domains that may execute with respect to the user input represented in the ASR output data 610. The size of the n-best list represented in the n-best list data 615 is configurable. In an example, the n-best list data 615 may indicate every domain of the system as well as contain an indication, for each domain, regarding whether the domain is likely capable to execute the user input represented in the ASR output data 610. In another example, instead of indicating every domain of the system, the n-best list data 615 may only indicate the domains that are likely to be able to execute the user input represented in the ASR output data 610. In yet another example, the shortlister component 550 may implement thresholding such that the n-best list data 615 may indicate no more than a maximum number of domains that may execute the user input represented in the ASR output data 610. In an example, the threshold number of domains that may be represented in the n-best list data 615 is ten. In another example, the domains included in the n-best list data 615 may be limited by a threshold a score, where only domains indicating a likelihood to handle the user input is above a certain score (as determined by processing the ASR output data 610 by the shortlister component 550 relative to such domains) are included in the n-best list data 615.

The ASR output data 610 may correspond to more than one ASR hypothesis. When this occurs, the shortlister component 550 may output a different n-best list (represented in the n-best list data 615) for each ASR hypothesis. Alternatively, the shortlister component 550 may output a single n-best list representing the domains that are related to the multiple ASR hypotheses represented in the ASR output data 610.

As indicated above, the shortlister component 550 may implement thresholding such that an n-best list output therefrom may include no more than a threshold number of entries. If the ASR output data 610 includes more than one ASR hypothesis, the n-best list output by the shortlister component 550 may include no more than a threshold number of entries irrespective of the number of ASR hypotheses output by the ASR component 250. Alternatively or in addition, the n-best list output by the shortlister component 550 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 610, the shortlister component 550 may generate confidence scores representing likelihoods that domains relate to the ASR output data 610. If the shortlister component 550 implements a different trained model for each domain, the shortlister component 550 may generate a different confidence score for each individual domain trained model that is run. If the shortlister component 550 runs the models of every domain when ASR output data 610 is received, the shortlister component 550 may generate a different confidence score for each domain of the system. If the shortlister component 550 runs the models of only the domains that are associated with skills indicated as enabled in a user profile associated with the device 110 and/or user that originated the user input, the shortlister component 550 may only generate a different confidence score for each domain associated with at least one enabled skill. If the shortlister component 550 implements a single trained model with domain specifically trained portions, the shortlister component 550 may generate a different confidence score for each domain who's specifically trained portion is run. The shortlister component 550 may perform matrix vector modification to obtain confidence scores for all domains of the system in a single instance of processing of the ASR output data 610.

N-best list data 615 including confidence scores that may be output by the shortlister component 550 may be represented as, for example:

Search domain, 0.67
Recipe domain, 0.62
Information domain, 0.57
Shopping domain, 0.42

As indicated, the confidence scores output by the shortlister component 550 may be numeric values. The confidence scores output by the shortlister component 550 may alternatively be binned values (e.g., high, medium, low).

The n-best list may only include entries for domains having a confidence score satisfying (e.g., equaling or exceeding) a minimum threshold confidence score. Alternatively, the shortlister component 550 may include entries for all domains associated with user enabled skills, even if one or more of the domains are associated with confidence scores that do not satisfy the minimum threshold confidence score.

The shortlister component 550 may consider other data 620 when determining which domains may relate to the user input represented in the ASR output data 610 as well as respective confidence scores. The other data 620 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 620 may include an indicator of the user associated with the ASR output data 610, for example as determined by a user recognition component (not shown).

The other data 620 may be character embedded prior to being input to the shortlister component 550. The other data 620 may alternatively be embedded using other techniques known in the art prior to being input to the shortlister component 550.

The other data 620 may also include data indicating the domains associated with skills that are enabled with respect to the device 110 and/or user that originated the user input. The shortlister component 550 may use such data to determine which domain-specific trained models to run. That is, the shortlister component 550 may determine to only run the trained models associated with domains that are associated with user-enabled skills. The shortlister component 550 may alternatively use such data to alter confidence scores of domains.

As an example, considering two domains, a first domain associated with at least one enabled skill and a second domain not associated with any user-enabled skills of the user that originated the user input, the shortlister component 550 may run a first model specific to the first domain as well as a second model specific to the second domain. Alternatively, the shortlister component 550 may run a model configured to determine a score for each of the first and second domains. The shortlister component 550 may determine a same confidence score for each of the first and second domains in the first instance. The shortlister component 550 may then alter those confidence scores based on which domains is associated with at least one skill enabled by the present user. For example, the shortlister component 550 may increase the confidence score associated with the domain associated with at least one enabled skill while leaving the confidence score associated with the other domain the same. Alternatively, the shortlister component 550 may leave the confidence score associated with the domain associated with at least one enabled skill the same while decreasing the confidence score associated with the other domain. Moreover, the shortlister component 550 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 550 receives the ASR output data 610, the shortlister component 550 may determine whether profile data associated with the user and/or device 110 that originated the command includes an indication of enabled skills.

The other data 620 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 550 may use such data to determine which domain-specific trained models to run. For example, if the device 110 corresponds to a displayless type device, the shortlister component 550 may determine not to run trained models specific to domains that output video data. The shortlister component 550 may alternatively use such data to alter confidence scores of domains.

As an example, considering two domains, one that outputs audio data and another that outputs video data, the shortlister component 550 may run a first model specific to the domain that generates audio data as well as a second model specific to the domain that generates video data. Alternatively the shortlister component 550 may run a model configured to determine a score for each domain. The shortlister component 550 may determine a same confidence score for each of the domains in the first instance. The shortlister component 550 may then alter the original confidence scores based on the type of the device 110 that originated the user input corresponding to the ASR output data 610. For example, if the device 110 is a displayless device, the shortlister component 550 may increase the confidence score associated with the domain that generates audio data while leaving the confidence score associated with the domain that generates video data the same. Alternatively, if the device 110 is a displayless device, the shortlister component 550 may leave the confidence score associated with the domain that generates audio data the same while decreasing the confidence score associated with the domain that generates video data. Moreover, if the device 110 is a displayless device, the shortlister component 550 may increase the confidence score associated with the domain that generates audio data as well as decrease the confidence score associated with the domain that generates video data.

The type of device information represented in the other data 620 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 620 may represent the smart TV of other display device, and not the displayless device that captured the spoken user input.

The other data 620 may also include data indicating the user input originating device's speed, location, or other mobility information. For example, the device may correspond to a vehicle including a display. If the vehicle is moving, the shortlister component 550 may decrease the confidence score associated with a domain that generates video data as it may be undesirable to output video content to a user while the user is driving. The device may output data to the system(s) 120 indicating when the device is moving.

The other data 620 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 550 may use such data to alter confidence scores of domains. For example, the shortlister component 550 may run a first model specific to a first domain as well as a second model specific to a second domain. Alternatively, the shortlister component 550 may run a model configured to determine a score for each domain. The shortlister component 550 may also determine a same confidence score for each of the domains in the first instance. The shortlister component 550 may then alter the original confidence scores based on the first domain being invoked to cause the system to output content while the current user input was received. Based on the first domain being invoked, the shortlister component 550 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 615 generated by the shortlister component 550 as well as the different types of other data 620 considered by the shortlister component 550 are configurable. For example, the shortlister component 550 may update confidence scores as more other data 620 is considered. For further example, the n-best list data 615 may exclude relevant domains if thresholding is implemented. Thus, for example, the shortlister component 550 may include an indication of a domain in the n-best list 615 unless the shortlister component 550 is one hundred percent confident that the domain may not execute the user input represented in the ASR output data 610 (e.g., the shortlister component 550 determines a confidence score of zero for the domain).

The shortlister component 550 may send the ASR output data 610 to recognizers 563 associated with domains represented in the n-best list data 615. Alternatively, the shortlister component 550 may send the n-best list data 615 or some other indicator of the selected subset of domains to another component (such as the orchestrator component 230) which may in turn send the ASR output data 610 to the recognizers 563 corresponding to the domains included in the n-best list data 615 or otherwise indicated in the indicator. If the shortlister component 550 generates an n-best list representing domains without any associated confidence scores, the shortlister component 550/orchestrator component 230 may send the ASR output data 610 to recognizers 563 associated with domains that the shortlister component 550 determines may execute the user input. If the shortlister component 550 generates an n-best list representing domains with associated confidence scores, the shortlister component 550/orchestrator component 230 may send the ASR output data 610 to recognizers 563 associated with domains associated with confidence scores satisfying (e.g., meeting or exceeding) a threshold minimum confidence score.

A recognizer 563 may output tagged text data generated by an NER component 562 and an IC component 564, as described herein above. The NLU component 260 may compile the output tagged text data of the recognizers 563 into a single cross-domain n-best list 640 and may send the cross-domain n-best list 640 to a pruning component 650. Each entry of tagged text (e.g., each NLU hypothesis) represented in the cross-domain n-best list data 640 may be associated with a respective score indicating a likelihood that the NLU hypothesis corresponds to the domain associated with the recognizer 563 from which the NLU hypothesis was output. For example, the cross-domain n-best list data 640 may be represented as (with each line corresponding to a different NLU hypothesis):

Intent: <PlayMusic> ArtistName: Beethoven SongName: Waldstein Sonata

Intent: <PlayVideo> ArtistName: Beethoven VideoName: Waldstein Sonata

Intent: <PlayMusic> ArtistName: Beethoven AlbumName: Waldstein Sonata

Intent: <PlayMusic> SongName: Waldstein Sonata

The pruning component 650 may sort the NLU hypotheses represented in the cross-domain n-best list data 640 according to their respective scores. The pruning component 650 may perform score thresholding with respect to the cross-domain NLU hypotheses. For example, the pruning component 650 may select NLU hypotheses associated with scores satisfying (e.g., meeting and/or exceeding) a threshold score. The pruning component 650 may also or alternatively perform number of NLU hypothesis thresholding. For example, the pruning component 650 may select the top scoring NLU hypothesis(es). The pruning component 650 may output a portion of the NLU hypotheses input thereto. The purpose of the pruning component 650 is to create a reduced list of NLU hypotheses so that downstream, more resource intensive, processes may only operate on the NLU hypotheses that most likely represent the user's intent.

The NLU component 260 may include a light slot filler component 652. The light slot filler component 652 can take text from slots represented in the NLU hypotheses output by the pruning component 650 and alter them to make the text more easily processed by downstream components. The light slot filler component 652 may perform low latency operations that do not involve heavy operations such as reference to a knowledge base (e.g., 572. The purpose of the light slot filler component 652 is to replace words with other words or values that may be more easily understood by downstream components. For example, if a NLU hypothesis includes the word "tomorrow," the light slot filler component 652 may replace the word "tomorrow" with an actual date for purposes of downstream processing. Similarly, the light slot filler component 652 may replace the word "CD" with "album" or the words "compact disc." The replaced words are then included in the cross-domain n-best list data 660.

The cross-domain n-best list data 660 may be input to an entity resolution component 670. The entity resolution component 670 can apply rules or other instructions to standardize labels or tokens from previous stages into an intent/slot representation. The precise transformation may depend on the domain. For example, for a travel domain, the entity resolution component 670 may transform text corresponding to "Boston airport" to the standard BOS three-letter code referring to the airport. The entity resolution component 670 can refer to a knowledge base (e.g., 572) that is used to specifically identify the precise entity referred to in each slot of each NLU hypothesis represented in the cross-domain n-best list data 660. Specific intent/slot combinations may also be tied to a particular source, which may then be used to resolve the text. In the example "play songs by the stones," the entity resolution component 670 may reference a personal music catalog, Amazon Music account, a user profile, or the like. The entity resolution component 670 may output an altered n-best list that is based on the cross-domain n-best list data 660 but that includes more detailed information (e.g., entity IDs) about the specific entities mentioned in the slots and/or more detailed slot data that can eventually be used by a skill. The NLU component 260 may include multiple entity resolution components 670 and each entity resolution component 670 may be specific to one or more domains.

The NLU component 260 may include a reranker 690. The reranker 690 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 670.

The reranker 690 may apply re-scoring, biasing, or other techniques. The reranker 690 may consider not only the data output by the entity resolution component 670, but may also consider other data 691. The other data 691 may include a variety of information. For example, the other data 691 may include skill rating or popularity data. For example, if one skill has a high rating, the reranker 690 may increase the score of a NLU hypothesis that may be processed by the skill. The other data 691 may also include information about skills that have been enabled by the user that originated the user input. For example, the reranker 690 may assign higher scores to NLU hypothesis that may be processed by enabled skills than NLU hypothesis that may be processed by non-enabled skills. The other data 691 may also include data indicating user usage history, such as if the user that originated the user input regularly uses a particular skill or does so at particular times of day. The other data 691 may additionally include data indicating date, time, location, weather, type of device 110, user identifier, context, as well as other information. For example, the reranker 690 may consider when any particular skill is currently active (e.g., music being played, a game being played, etc.).

As illustrated and described, the entity resolution component 670 is implemented prior to the reranker 690. The entity resolution component 670 may alternatively be implemented after the reranker 690. Implementing the entity resolution component 670 after the reranker 690 limits the NLU hypotheses processed by the entity resolution component 670 to only those hypotheses that successfully pass through the reranker 690.

The reranker 690 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2B). The NLU component 260 may separately perform NLU processing described above with respect to domains associated with skills that are at least partially implemented as part of the skill system(s) 125. In an example, the shortlister component 550 may only process with respect to these latter domains. Results of these two NLU processing paths may be merged into NLU results data 685, which may be sent to a post-NLU ranker 265, which may be implemented by the system(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 685, skill result data 630, and the other data 620 in order to output NLU output data 625. The NLU output data 625 may include an n-best list where the NLU hypotheses in the NLU results data 685 are reordered such that the n-best list in the NLU output data 625 represents a prioritized list of skills to respond to a user input as determined by the post-NLU ranker 265. The NLU output data 625 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 685 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 630 based on the first NLU hypothesis and the second NLU hypothesis, respectively. For example, the post-NLU ranker 265 may send the first NLU hypothesis to the first skill 290a along with a request for the first skill 290a to at least partially execute with respect to the first NLU hypothesis. The post-NLU ranker 265 may also send the second NLU hypothesis to the second skill 290b along with a request for the second skill 290b to at least partially execute with respect to the second NLU hypothesis. The post-NLU ranker 265 receives, from the first skill 290a, first result data 630a generated from the first skill 290a's execution with respect to the first NLU hypothesis. The post-NLU ranker 265 also receives, from the second skill 290b, second results data 630b generated from the second skill 290b's execution with respect to the second NLU hypothesis.

The skill result data 630 may include various portions. For example, the result data 630 may include content (e.g., audio data, text data, and/or video data) to be output to a user. The result data 630 may also include a unique identifier used by the system(s) 120 and/or the skill system(s) 125 to locate the data to be output to a user. The result data 630 may also include an instruction. For example, if the user input corresponds to "turn on the light," the result data 630 may include an instruction causing the system to turn on a light associated with a profile of the device (110a/110b) and/or user.

The post-NLU ranker 265 may consider the first result data 630a and the second result data 630b to alter the first confidence score and the second confidence score of the first NLU hypothesis and the second NLU hypothesis, respectively. That is, the post-NLU ranker 265 may generate a third confidence score based on the first result data 630a and the first confidence score. The third confidence score may correspond to how likely the post-NLU ranker 265 determines the first skill will correctly respond to the user input. The post-NLU ranker 265 may also generate a fourth confidence score based on the second result data 630b and the second confidence score. One skilled in the art will appreciate that a first difference between the third confidence score and the fourth confidence score may be greater than a second difference between the first confidence score and the second confidence score. The post-NLU ranker 265 may also consider the other data 620 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 630 associated with the skill 290 with the highest altered confidence score to be the data output in response to the current user input. The post-NLU ranker 265 may also consider the ASR output data 610 to alter the NLU hypotheses confidence scores.

The orchestrator component 230 may, prior to sending the NLU results data 685 to the post-NLU ranker 265, associate intents in the NLU hypotheses with skills 290. For example, if a NLU hypothesis includes a <PlayMusic> intent, the orchestrator component 230 may associate the NLU hypothesis with one or more skills 290 that can execute the <PlayMusic> intent. Thus, the orchestrator component 230 may send the NLU results data 685, including NLU hypotheses paired with skills 290, to the post-NLU ranker 265. In response to ASR output data 610 corresponding to "what should I do for dinner today," the orchestrator component 230 may generates pairs of skills 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill 290, paired with a NLU hypothesis in the NLU results data 685, to provide result data 630 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 630. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 630 indicating slots of a framework that the skill 290 further needs filled or entities that the skill 290 further needs resolved prior to the skill 290 being able to provided result data 630 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 630 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 630 provided by the skills 290 to alter the NLU processing confidence scores generated by the reranker 690. That is, the post-NLU ranker 265 uses the result data 630 provided by the queried skills 290 to create larger differences between the NLU processing confidence scores generated by the reranker 690. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 630 responsive to NLU hypotheses over skills 290 that provide result data 630 corresponding to an indication that further information is needed, as well as skills 290 that provide result data 630 indicating they can provide multiple responses to received NLU hypotheses. For example, the post-NLU ranker 265 may generate a first score for a first skill 290a that is greater than the first skill's NLU confidence score based on the first skill 290a providing result data 230a including a response to a NLU hypothesis. For further example, the post-NLU ranker 265 may generate a second score for a second skill 290b that is less than the second skill's NLU confidence score based on the second skill 290b providing result data 630b indicating further information is needed for the second skill 290b to provide a response to a NLU hypothesis. Yet further, for example, the post-NLU ranker 265 may generate a third score for a third skill 290c that is less than the third skill's NLU confidence score based on the third skill 290c providing result data 630c indicating the third skill 290c can provide multiple responses to a NLU hypothesis.

The post-NLU ranker 265 may consider other data 620 in determining scores. The other data 620 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290a that is greater than the first skill's NLU processing confidence score based on the first skill 290a being associated with a high ranking. For further example, the post-NLU ranker 265 may generate a second score for a second skill 290b that is less than the second skill's NLU processing confidence score based on the second skill 290b being associated with a low ranking.

The other data 620 may include information indicating whether or not the user that originated the user input has enabled one or more of the queried skills 290. For example, the post-NLU ranker 265 may generate a first score for a first skill 290a that is greater than the first skill's NLU processing confidence score based on the first skill 290a being enabled by the user that originated the user input. For further example, the post-NLU ranker 265 may generate a second score for a second skill 290b that is less than the second skill's NLU processing confidence score based on the second skill 290b not being enabled by the user that originated the user input. When the post-NLU ranker 265 receives the NLU results data 685, the post-NLU ranker 265 may determine whether profile data, associated with the user and/or device that originated the user input, includes indications of enabled skills.

The other data 620 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 620 may include information indicating the veracity of the result data 630 provided by a skill 290. For example, if a user says "tell me a recipe for pasta sauce," a first skill 290a may provide the post-NLU ranker 265 with first result data 630a corresponding to a first recipe associated with a five star rating and a second skill 290b may provide the post-NLU ranker 265 with second result data 630b corresponding to a second recipe associated with a one star rating. In this situation, the post-NLU ranker 265 may increase the NLU processing confidence score associated with the first skill 290a based on the first skill 290a providing the first result data 630a associated with the five star rating and/or decrease the NLU processing confidence score associated with the second skill 290b based on the second skill 290b providing the second result data 630b associated with the one star rating.

The other data 620 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290a corresponding to a room service skill associated with the hotel and/or decrease the NLU processing confidence score associated with a second skill 290b corresponding to a food skill not associated with the hotel.

The other data 620 may include information indicating a location of the device and/or user that originated the user input. The system may be configured with skills 290 that may only operate with respect to certain geographic locations. For example, a user may provide a user input corresponding to "when is the next train to Portland." A first skill 290a may operate with respect to trains that arrive at, depart from, and pass through Portland, Oregon. A second skill 290*b* may operate with respect to trains that arrive at, depart from, and pass through Portland, Maine. If the device and/or user that originated the user input is located in Seattle, Washington, the post-NLU ranker 265 may increase the NLU processing confidence score associated with the first skill 290*a* and/or decrease the NLU processing confidence score associated with the second skill 290*b*. Likewise, if the device and/or user that originated the user input is located in Boston, Massachusetts, the post-NLU ranker 265 may increase the NLU processing confidence score associated with the second skill 290*b* and/or decrease the NLU processing confidence score associated with the first skill 290*a*.

The other data 620 may include information indicating a time of day. The system may be configured with skills 290 that operate with respect to certain times of day. For example, a user may provide a user input corresponding to "order me food." A first skill 290*a* may generate first result data 630*a* corresponding to breakfast. A second skill 290*b* may generate second result data 630*b* corresponding to dinner. If the system(s) 120 receives the user input in the morning, the post-NLU ranker 265 may increase the NLU processing confidence score associated with the first skill 290*a* and/or decrease the NLU processing score associated with the second skill 290*b*. If the system(s) 120 receives the user input in the afternoon or evening, the post-NLU ranker 265 may increase the NLU processing confidence score associated with the second skill 290*b* and/or decrease the NLU processing confidence score associated with the first skill 290*a*.

The other data 620 may include information indicating user preferences. The system may include multiple skills 290 configured to execute in substantially the same manner. For example, a first skill 290*a* and a second skill 290*b* may both be configured to order food from respective restaurants. The system may store a user preference (e.g., in the profile storage 270) that is associated with the user that provided the user input to the system(s) 120 as well as indicates the user prefers the first skill 290*a* over the second skill 290*b*. Thus, when the user provides a user input that may be executed by both the first skill 290*a* and the second skill 290*b*, the post-NLU ranker 265 may increase the NLU processing confidence score associated with the first skill 290*a* and/or decrease the NLU processing confidence score associated with the second skill 290*b*.

The other data 620 may include information indicating system usage history associated with the user that originated the user input. For example, the system usage history may indicate the user originates user inputs that invoke a first skill 290*a* more often than the user originates user inputs that invoke a second skill 290*b*. Based on this, if the present user input may be executed by both the first skill 290*a* and the second skill 290*b*, the post-NLU ranker 265 may increase the NLU processing confidence score associated with the first skill 290*a* and/or decrease the NLU processing confidence score associated with the second skill 290*b*.

The other data 620 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290*a* that generates audio data. The post-NLU ranker 265 may also or alternatively decrease the NLU processing confidence score associated with a second skill 290*b* that generates image data or video data.

The other data 620 may include information indicating how long it took a skill 290 to provide result data 630 to the post-NLU ranker 265. When the post-NLU ranker 265 multiple skills 290 for result data 630, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 620 to increase and decrease NLU processing confidence scores associated with various skills 290 that the post-NLU ranker 265 has already requested result data from. Alternatively, the post-NLU ranker 265 may use the other data 620 to determine which skills 290 to request result data from. For example, the post-NLU ranker 265 may use the other data 620 to increase and/or decrease NLU processing confidence scores associated with skills 290 associated with the NLU results data 685 output by the NLU component 260. The post-NLU ranker 265 may select n-number of top scoring altered NLU processing confidence scores. The post-NLU ranker 265 may then request result data 630 from only the skills 290 associated with the selected n-number of NLU processing confidence scores.

As described, the post-NLU ranker 265 may request result data 630 from all skills 290 associated with the NLU results data 685 output by the NLU component 260. Alternatively, the system(s) 120 may prefer result data 630 from skills implemented entirely by the system(s) 120 rather than skills at least partially implemented by the skill system(s) 125. Therefore, in the first instance, the post-NLU ranker 265 may request result data 630 from only skills associated with the NLU results data 685 and entirely implemented by the system(s) 120. The post-NLU ranker 265 may only request result data 630 from skills associated with the NLU results data 685, and at least partially implemented by the skill system(s) 125, if none of the skills, wholly implemented by the system(s) 120, provide the post-NLU ranker 265 with result data 630 indicating either data response to the NLU results data 685, an indication that the skill can execute the user input, or an indication that further information is needed.

As indicated above, the post-NLU ranker 265 may request result data 630 from multiple skills 290. If one of the skills 290 provides result data 630 indicating a response to a NLU hypothesis and the other skills provide result data 630 indicating either they cannot execute or they need further information, the post-NLU ranker 265 may select the result data 630 including the response to the NLU hypothesis as the data to be output to the user. If more than one of the skills 290 provides result data 630 indicating responses to NLU hypotheses, the post-NLU ranker 265 may consider the other data 620 to generate altered NLU processing confidence scores, and select the result data 630 of the skill associated with the greatest score as the data to be output to the user.

A system that does not implement the post-NLU ranker 265 may select the highest scored NLU hypothesis in the NLU results data 685. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 685 to provide result data 630 to the post-NLU ranker 265 prior to the post-NLU ranker 265 ultimately determining the skill 290 to be invoked to respond to the user input. Some of the skills 290 may provide result data 630 indicating responses to NLU hypotheses while other skills 290 may providing result data 630 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 630, associated with the skill 290 associated with the highest score, for output to the user. Alternatively, the post-NLU ranker 265 may output NLU output data 625 indicating skills 290 and their respective post-NLU ranker rankings. Since the post-NLU ranker 265 receives result data 630, potentially corresponding to a response to the user input, from the skills 290 prior to post-NLU ranker 265 selecting one of the skills or outputting the NLU output data 625, little to no latency occurs from the time skills provide result data 630 and the time the system outputs responds to the user.

If the post-NLU ranker 265 selects result audio data to be output to a user and the system determines content should be output audibly, the post-NLU ranker 265 (or another component of the system(s) 120) may cause the device 110a and/or the device 110b to output audio corresponding to the result audio data. If the post-NLU ranker 265 selects result text data to output to a user and the system determines content should be output visually, the post-NLU ranker 265 (or another component of the system(s) 120) may cause the device 110b to display text corresponding to the result text data. If the post-NLU ranker 265 selects result audio data to output to a user and the system determines content should be output visually, the post-NLU ranker 265 (or another component of the system(s) 120) may send the result audio data to the ASR component 250. The ASR component 250 may generate output text data corresponding to the result audio data. The system(s) 120 may then cause the device 110b to display text corresponding to the output text data. If the post-NLU ranker 265 selects result text data to output to a user and the system determines content should be output audibly, the post-NLU ranker 265 (or another component of the system(s) 120) may send the result text data to the TTS component 280. The TTS component 280 may generate output audio data (corresponding to computer-generated speech) based on the result text data. The system(s) 120 may then cause the device 110a and/or the device 110b to output audio corresponding to the output audio data.

As described, a skill 290 may provide result data 630 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 630 indicating a response to the user input, the post-NLU ranker 265 (or another component of the system(s) 120, such as the orchestrator component 230) may simply cause content corresponding to the result data 630 to be output to the user. For example, the post-NLU ranker 265 may send the result data 630 to the orchestrator component 230. The orchestrator component 230 may cause the result data 230 to be sent to the device (110a/110b), which may output audio and/or display text corresponding to the result data 230. The orchestrator component 230 may send the result data 630 to the ASR component 250 to generate output text data and/or may send the result data 630 to the TTS component 280 to generate output audio data, depending on the situation.

The skill 290 associated with the highest post-NLU ranker score may provide the post-NLU ranker 265 with result data 630 indicating more information is needed as well as instruction data. The instruction data may indicate how the skill 290 recommends the system obtain the needed information. For example, the instruction data may correspond to text data or audio data (i.e., computer-generated speech) corresponding to "please indicate_____." The instruction data may be in a format (e.g., text data or audio data) capable of being output by the device (110a/110b). When this occurs, the post-NLU ranker 265 may simply cause the received instruction data be output by the device (110a/110b). Alternatively, the instruction data may be in a format that is not capable of being output by the device (110a/110b). When this occurs, the post-NLU ranker 265 may cause the ASR component 250 or the TTS component 280 to process the instruction data, depending on the situation, to generate instruction data that may be output by the device (110a/110b). Once the user provides the system with all further information needed by the skill 290, the skill 290 may provide the system with result data 630 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 630 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 630, the system may further engage a transactional skill 290 after the transactional skill 290 provides the post-NLU ranker 265 with result data 630 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 7:
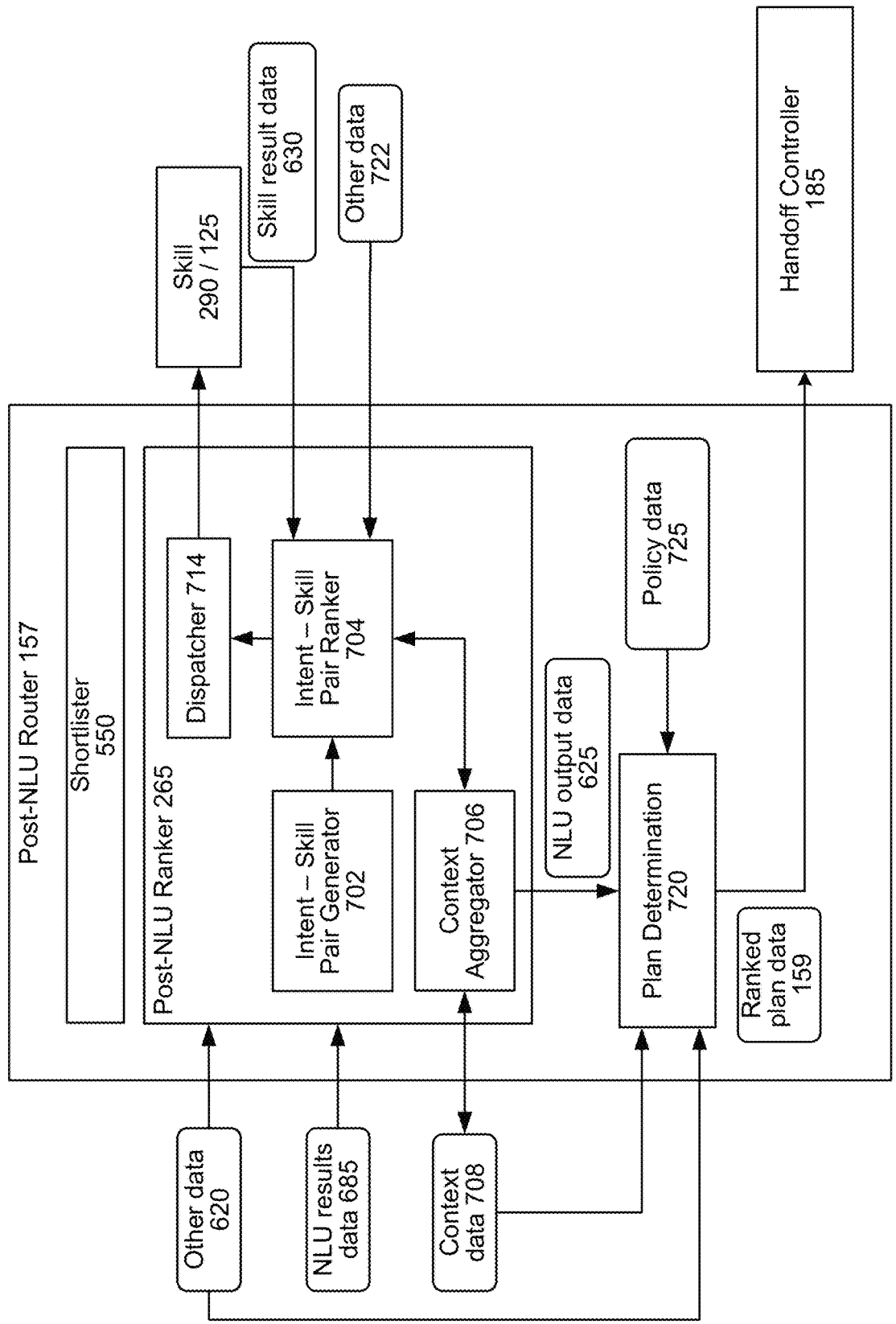
FIG. 7 is a conceptual diagram illustrating components that perform post-natural language understanding processing, according to embodiments of the present disclosure.

FIG. 7 illustrates other configurations and operations of components of the post-NLU router 157 including the post-NLU ranker 265 and plan determination component 720. When the post-NLU ranker 265 receives NLU results data 685, the NLU results data 685 may be sent to an intent-skill pair generator 702. The intent-skill pair generator 702 may include information about what skills are capable of handling what intents. Such information may be context agnostic, and may thus indicate what skills are capable of handling what intents generally, without regard to the context associated with the user input. The intent-skill pair generator 702 thus receives the NLU results data 685 and identifies what particular candidate skills may handle the intent for NLU hypothesis. For example, if a NLU hypothesis includes a particular intent, the intent-skill pair generator 702 identifies each skill that may execute with respect to the intent. For further example, if the NLU results data 685 include multiple NLU hypotheses including multiple intents, the intent-skill pair generator 702 associates each different NLU hypothesis with each skill that may execute with respect to the NLU hypothesis. As illustrated, the intent-skill pair generator 702 may be implemented at part of the post-NLU ranker 265. However, one skill in the art will appreciate that the intent-skill pair generator 702 may be implemented as part of the NLU component 260 or in another component without departing from the present disclosure. In such a case, the NLU results data 685 may include intent-skill pairs.

The post-NLU ranker 265 may also include an intent-skill pair ranker 704. The intent-skill pair ranker 704 ranks the intent-skill pairs generated by the intent-skill pair generator 702 based on, for example, the number of filled slots of a NLU hypothesis, an NLU confidence score associated with a NLU hypothesis, context information output by a context aggregator 706, and/or other data.

The post-NLU ranker 265 may include the context aggregator 706. The context aggregator 706 receives context data 708 from various contextual sources. The context data 708 may include time data, which represents a time of receipt of the user input by the device 110, a time or receipt of the user input by the system(s) 120, a user identifier associated with the user input, a device identifier of the device 110, the wakeword spoken by the user, whether other devices are linked to the device 110, and/or other information. The context aggregator 706 may aggregate the context data 708 and put the context data 708 in a form that can be processed by the intent-skill pair ranker 704. Context data 708 may include data obtained from the device 110 or from other services connected to the system(s) 120.

The context data 708 may include skill availability data. Such information may indicate what skills are available and authorized to process the user input. For example, if the user has only enabled certain skills, the enabled skills may be noted in the skill availability data.

The context data 708 may also include dialogue data. A "dialogue" or "dialogue session" as used herein may refer to data transmissions (such as relating to multiple user inputs and system(s) 120 outputs) between the system(s) 120 and a local device (e.g., the device 110) that all relate to a single originating user input. Thus, the data transmissions of a dialogue session may share a dialogue identifier or other unique identifier that may be used by the orchestrator component 230, skill(s) 290, skill server(s) 125, etc. to track information across the dialogue session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialogue session related to the originating user input "play jeopardy." In some examples, a dialogue-initiating user input may start with a wakeword and end with a command, such as "Alexa, play jeopardy," where "Alexa" is the wakeword and "play jeopardy" is the command. Subsequent user inputs of the same dialogue session may or may not start with speaking of a wakeword. Each user input of a dialogue may be associated with a unique user input identifier such that multiple user input identifiers may be associated with a single dialogue session identifier.

Dialogue data may include interactive focus information, (e.g., representing which skill was most recently invoked to execute a previous user input for the user and/or device 110 associated with the present user input). Dialogue data may also include content focus information (e.g., representing a skill that is streaming data to the device 110 when the data corresponding to the current user input is received by the system(s) 120). The context data 708 may be one portion of the data used by the intent-skill pair ranker 704 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 708 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 708 (and/or other data 722) may include a metadata flag/indicator that represents whether the particular skill being executed is one that can handle a go-back (or other navigational) request.

The context data 708 may also include user profile data. The user profile data may represent preferences and/or characteristics of the user that originated the current user input. Such data may be received from the profile storage 270.

The context data 708 may also include location data. The location data may represent a location of the device 110 from which the user input was received.

The context data 708 may also include anaphora data. Anaphora data may be data used to resolve anaphora, exophora, or other references (like pronouns such as he, she, etc.) to entities that are not explicitly named in a user input.

The anaphora data may include entity identifiers or other information used to resolve anaphoric references in a user input.

For example, while interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the user may expect the system to provide the hours (or the closing time) of the Starbucks that was just part of an exchange between the user and the system. In another example, after asking the system to "play Beethoven's $5^{th}$ Symphony" the user may ask the system "when did he write that?" In order to answer the second query, the system must understand that "he" refers to Beethoven and "that" refers to the musical work $5^{th}$ Symphony. Words that refer to an entity but do not explicitly name the entity are an example of anaphora, namely a word referring to or replacing another word.

Other references to other text may also be processed by the system. For example, exophora is a reference in text to something external to the text, endophora is a reference to something preceding or following the reference within the text, and cataphora is a reference to a following word or group or words. The system may be configured to process these, and other similar types of references (which may generally be referred to below as anaphora). Further, while a language such as English may use unknown words to substitute for anaphora/(e.g., pronouns), other languages, such as Japanese may allow phrasing of anaphora without a specific word to represent the anaphora (referred to as zero-phrase anaphora), and other languages may use other forms of reference. The present system may be used to resolve many such forms of anaphora across many different languages.

The context data 708 may also include data regarding whether one or more skills are "in focus." A skill may be in interactive focus, meaning the skill was the most recent skill that executed a user input for a user or device associated with a present user input and/or the skill may be involved with an open dialogue (e.g., series of user inputs and responses) with a user device. Interactive focus attempts to continue a conversation between a user and the system and/or a skill for purposes of processing the dialogue. However, there may be instances where a user inputs a command that may be handled by a skill that is currently in interactive focus, but which the user does not intend to be executed by such skill. The system may process the context data 708 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 708 may also include other context data not explicitly recited herein.

The intent-skill pair ranker 704 may operate one or more trained models that are configured to process the NLU results data 685, skill result data 630, and other data 722 in order to determine a single best skill for executing the current user input from the available pairs output by the intent-skill pair generator 702. The intent-skill pair ranker 704 may send queries to the skills and request a first skill and a second skill (for example the candidate skills identified by the pair generator 702), to provide potential result data indicating whether the skill can handle the intent at the particular moment and if so, what the output data for the particular skill would be (e.g., data the skill would provide to a user if the skill were selected to execute the user input) based on the NLU results data 685. For example, the intent-skill pair ranker 704 may send a first NLU hypothesis, associated with a first skill, to the first skill along with a request for the first skill to at least partially execute with respect to the first NLU hypothesis. The intent-skill pair ranker 704 may also send a second NLU hypothesis, associated with the second skill, to the second skill along with a request for the second skill to at least partially execute with respect to the second NLU hypothesis. The intent-skill pair ranker 704 receives, from the first skill, first result data 630a generated from the first skill's execution with respect to the first NLU hypothesis. The intent-skill pair ranker 704 also receives, from the second skill, second results data 630b generated from the second skill's execution with respect to the second NLU hypothesis. Based on the first results data 630a, a first NLU confidence score associated with the first NLU hypothesis, the second results data 630b, a second NLU confidence score associated with the second NLU hypothesis, and other data 722 (e.g., context data, user profile data, etc.), the intent-skill pair ranker 704 determines the best skill for executing the current user input. The intent-skill pair ranker 704 sends an indication of the best skill to a dispatcher component 714.

The dispatcher 714 may then send the selected skill the information needed to execute the user input, including an indication of the intent, the appropriate context data 708 (such as device identifier, user identifier, or the like), slot data, utterance identifier, dialogue identifier, or any other information needed.

As shown in FIG. 7, the post-NLU router 157 may also include a plan determination component 720. The plan determination component 720 may process a variety of data including other data 620, context data 780, NLU output data 625, policy data 725 and/or other data to determine a set of plans for processing and executing the incoming utterance. As described herein a plan may include performing a handoff between one CPS and another.

The plan determination component 720 may consider a variety of data corresponding to the incoming utterance. Such data corresponding to the incoming utterance is represented in FIG. 7 as other data 620, context data 708, and NLU output data 625, though other data may be used. (In FIG. 7 (and FIG. 9) such data may be shown being sent directly to the plan determination component 720 but such data may be routed to the plan determination component 720 by another component, such as the orchestrator 230.) As noted above, the NLU output data 625 may include the various hypotheses and corresponding scores of the machine interpretations of the incoming utterance or other natural language input (e.g., a typed input). The utterance-related data processed by the plan determination component 720 may include an indication of an invoked assistant/CPS. For example, if a user spoke a particular wakeword corresponding to the particular CPS (e.g., "Alexa," "Hal," etc.) an indication of that spoken wakeword and/or CPS may be provided (for example as part of other data 620, context data 708, NLU output data 625, or other data) to the plan determination component 720. In another example, if a user performed a gesture, button-push or other invocation corresponding to the particular CPS an indication of that invocation and/or CPS may be provided (for example as part of other data 620, context data 708, NLU output data 625, or other data) to the plan determination component 720. In a situation where a particular CPS may not have been invoked, an indication of a default CPS or other CPS to be primarily associated with the user input may be provided (for example as part of other data 620, context data 708, NLU output data 625, or other data) to the plan determination component 720. This invoked/default assistant may be considered the source assistant.

Figure 8:
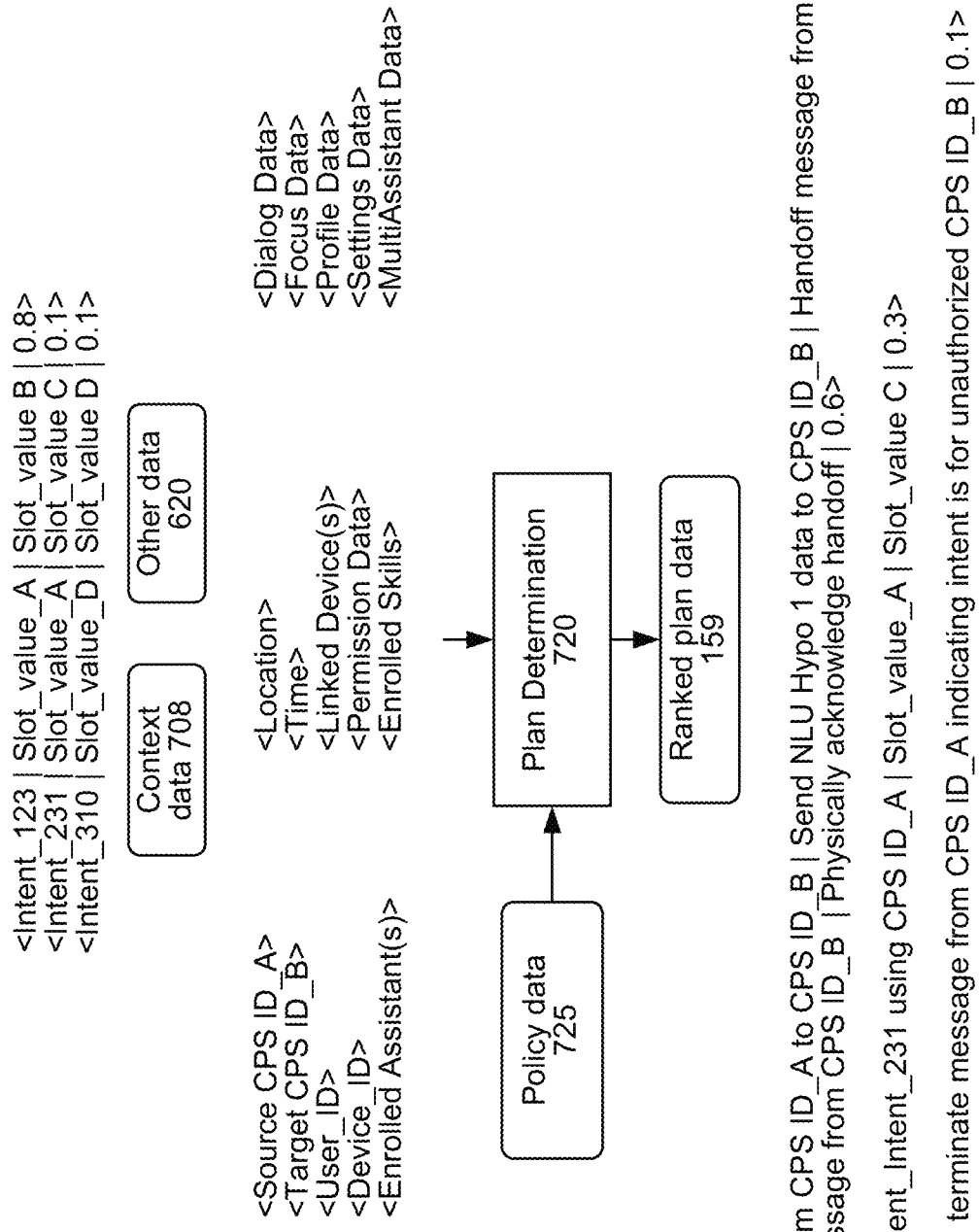
FIG. 8 illustrates data that may be input to and output from a centralized plan determination component, according to embodiments of the present disclosure.

Examples of data available to plan determination component 720 are illustrated in FIG. 8. For example, the NLU output data 625 may indicate a ranked/scored list of interpretations of the user input. For example, as shown in FIG. 8 the NLU output data 625 may indicate:
<Intent_123|Slot_value_A|Slot_value_B|0.8>
<Intent_231|Slot_value_A|Slot_value_C|0.1>
<Intent_310|Slot_value_D|Slot_value_D|0.1>

As also shown in FIG. 8, the plan determination component 720 may also receive context data 708/other data 620. Such data may include, for example, an indication of a source CPS; target CPS ID; user ID; device ID; assistant(s) that may be enrolled for the respective utterance, device, user, etc.; location of the user/device; time data related to the utterance/user input; other linked device(s) that may be in an environment of the query; permission data; skills that may be enrolled for the respective utterance, device, user, etc.; dialog data including, for example, a dialog ID, data related to previously activated assistants/CPSs, previous entities referred to, etc.; focus data indicating what skills/CPSs, etc. may be in focus; profile data for the user/device/household, etc.; other settings data; multi-assistant data, for example from the multi-assistant component 115, assistant metadata component 155, etc.; or other context data 708/other data 620 discussed herein or otherwise.

The plan determination component 720 may also have available to it the one or more CPSs associated with the particular intents represented in the NLU output data 625. For example, an intent may have associated with it one or more skills that can handle the intent and those skill(s) may be associated with one or more particular CPSs. For example, in an example where the NLU output data 625 includes hypotheses with two different potential intents (for example, <PlayMusic> and <PlayVideo>), data available to the plan determination component 720 may indicate the skills and/or CPSs that can handle the intents. Such data may, for example, include the following:
Intent: <PlayMusic> Skill 1; CPS ID_A
Intent: <PlayMusic> Skill 2; CPS ID_A
Intent: <PlayMusic> Skill 3; CPS ID_B
Intent: <PlayMusic> Skill 4; CPS ID_C or CPS ID_D
Intent: <PlayVideo> Skill 5; CPS_B As can be appreciated, many different intent/skill/CPS combinations are possible. The CPS associated with a particular intent may be referred to as the target assistant. The above data may be provided to the plan determination component 720 as part of other data 620, context data 708, NLU output data 625, or other data.

In certain situations the CPS associated with an intent (e.g., target assistant) may correspond to the invoked/default assistant (e.g., source assistant). In those situations the plan determination component 720 may output plan data that does not involve a handoff between CPSs. In other situations, where the target assistant is not the same as the source assistant, the plan determination component 720 may output plan data that involves a handoff. For example, if a user utters a command, "Alexa, roll up the windows," the source assistant (e.g., Alexa) may not be the best assistant for activating features of a vehicle 110a, and that a different target assistant (e.g., Hal) may be a more appropriate assistant.

As shown in FIGS. 7 and 8, the plan determination component 720 may also use policy data 725 to determine plan data to output. The policy data 725 may include rules, tables, or other data relating to the many different permutations of intents, assistant, potential handoffs, etc. Alternatively, or in addition, the policy data 725 may corresponding to a trained model (included as part of the policy data 725 and/or operable by the plan determination component 720) which may process the available data to determine ranked plan data 159 to be output. Thus the plan determination component 720 may operate a model to consider the various data to determine output plan data.

The policy data 725/rules/model(s), etc. may be trained/configured by the system 100 to account for the various situations of input commands to be handled as part of an execution plan. The centralized arrangement of the plan determination component 720/handoff controller 185/orchestrator 230 allows the system 100 to also coordinate retraining/updating the policy data 725/plan determination component 720 in response to feedback (for example as discussed below in reference to FIG. 10).

The policy data 725 may be evaluated by the plan determination component 720 with respect to other input data (e.g., NLU output data 625, other data 620, context data 708, etc.) to determine what plan(s) should be output/ranked for the particular situation.

As can be appreciated, the policy data 725 may cover a variety of different scenarios. For example, each assistant may be associated with different policies, such as different execution policies and/or different handoff policies. For example, policy data may indicate that handoff from CPS ID_A to CPS ID_B should always use the voice and audio characteristics of CPS ID_A but that handoff from CPS ID_B to CPS ID_A may use a different voice/audio characteristics of the particular CPS depending on the intent being handed off. The audio characteristics corresponding to a particular "voice" of a CPS may correspond to data used by a TTS component 280 to perform processing as described below.

The policy data 725 may also be based on data available from the assistant metadata component 155. For example, the policy data 725 may consider which CPSs are permitted to share data between other CPSs, for example a first CPS may be prohibited from sending certain data (and/or the system may be prohibited from sending data related to an utterance that invoked the first CPS) to a second CPS due to a situation unrelated to the utterance. Alternatively, a first CPS may be permitted to share information with a second CPS (and/or the system may be permitted to send relating to an utterance that invoked the first CPS) only under certain circumstances. Such conditions may be considered as part of the policy data 725.

The policy data 725 may also indicate circumstances in which no intent execution or handoff should occur, such that the output responsive to the utterance may indicate the system is not handling the utterance, such as in the form of spoken response, error message/light/tone, etc.

As can be appreciated, a variety of other data regarding how utterances should be handled may be incorporated in the policy data 725.

As a result of consideration of the various data discussed herein, the plan determination component 720 may output ranked plan data 159. The ranked plan data 159 may include a ranked list of plans, where each plan includes indicators of instructions to be executed in response to the user input. The ranked plan data 159 may include an N-best list of such plans, where each item in the list may be associated with a score corresponding to the likelihood the particular plan is most appropriately responsive to the user input. Thus, based at least in part on the policy data 725 and the utterance specific data, the plan determination component 720 may determine one or more plans that the system can use to respond to the user input.

In certain examples, data for a particular plan may simply be to execute the intent using the source assistant without any transfer. For example, if the highest scoring NLU hypothesis (as represented in the NLU output data 625) includes an intent/skill that matches the source assistant, one plan in the ranked plan data 159 may indicate, for example:

<
Execute Intent_Intent_231 using CPS ID_A|
Slot_value_A|
Slot_value C|
[score]
>

In another example, if the highest scoring NLU hypothesis (as represented in the NLU output data 625) includes an intent/skill that does not match the source assistant, and the policy data 725 along with the other input data indicates to the plan determination component 720 that a handoff is appropriate where data is exchanged between the CPSs and the system outputs a handoff message using the user device, one plan in the ranked plan data 159 may indicate, for example:

<
Handoff from CPS ID_A to CPS ID_B|
Send NLU Hypo 1 data to CPS ID_B|
Handoff message from CPS ID_A|
Receive Message from CPS ID_B|
Physically acknowledge handoff
[score]
>

The specific handoff message and/or other data may not be indicated in the plan. Instead, a downstream component such as the handoff controller 185 (as explained below) may coordinate between the indicated CPSs to determine the handoff message and other data to be filled into the plan.

In another example of a plan, if the plan determination component 720 determines based on the input data that processing for the utterance should terminate, one plan in the ranked plan data 159 may indicate, for example:

<
Terminate|
terminate message from CPS ID_A indicating intent is for unauthorized CPS ID_B|
[score]
>

The specific terminate message and/or other data may be determined by the handoff controller 185.

As indicated above, certain plans may call for termination of processing with regard to an utterance, for example when a requested intent is not authorized for a particular user and/or when a requested intent matches a target assistant that is not authorized for the particular utterance/user/device, etc. In another situation a policy may call for handoff between CPSs but user permissions (or CPS data, etc.) may not permit information to be transferred between a first CPS and second CPS. In such a situation, a plan may indicate for processing with respect to the user input to terminate. Such terminations may involve different outputs to a user. Such outputs may (or may not) indicate the cause of termination of processing. For example, if a user is a child and the intent is not authorized, the output may indicate that the intent is not permitted for a child and processing terminates. Or the output may indicate that a parent's authorization is needed and the plan may call for a request to a parent ID for authority to execute the command. In another example, the termination may indicate that the necessary assistant/CPS is not enabled and the user should change permission settings to enable the CPS.

Under certain conditions examples of a handoff plan, an execute plan, and a terminate plan may all be included in the ranked plan data 159 in response to a single user input. For example, as shown in FIG. 8 the ranked plan data 159 may include an example of each with respective scores (e.g., 0.6 for the handoff plan, 0.3 for the execute plan, and 0.1 for the terminate plan). As can be appreciated, multiple plans in ranked plan data 159 in response to a single user input may actually include several of the same option (e.g., handoff, execute, terminate, other) with different other data included depending on the scenario. For example, in one set of ranked plan data 159 one plan may correspond to handoff between CPS ID_A and CPS ID_B while another may correspond to handoff between CPS ID_A and CPS ID_C, etc. In another example, in another set of ranked plan data 159 one plan may indicate that certain data is permitted to be transferred between CPSs while another plan may indicate that a second CPS is to be invoked and output an indication to the user that the second CPS is available, but that no utterance information should be given to the second CPS prior to the output of that indication.

The plan data may also indicate what data (if any) is to be sent to a target CPS. For example, in certain scenarios the plan may indicate that a target CPS may be sent an intent ID and device ID while in other scenarios the plan may indicate that a target CPS may be sent raw audio data (or ASR data, or other data) representing the utterance so that component(s) of the target CPS may perform its own analysis of the user input.

As can be appreciated, the system may be capable of generating many different examples of execution plans. For example, if a user speaks an utterance invoking a first assistant for a first intent, but that intent is not permitted by the first assistant/CPS, the plan may indicate to have the system respond with a message partially in the "voice" of the first assistant and partially in the "voice" of a second assistant corresponding to a second CPS that may execute the intent. In another example a user may speak a multi-prong utterance (for example, purchasing two different items) to a single CPS but that source CPS may only be capable of placing an order for the first such item and the second such item must be ordered through a different target CPS. Thus the system may indicate a plan to execute the purchase orders for both products using their respective authorized CPSs but the plan may also indicate to respond with a message partially in the "voice" of the first assistant regarding purchase of the first item and partially in the "voice" of a second assistant corresponding to the different CPS regarding purchase of the second item.

In another example, a plan may indicate to request from the user permission to execute an intent using a target CPS, for example if a target CPS is not permitted to be invoked without express user authentication. In another example, a plan may indicate that utterance processing should be terminated because no user permission is possible because the invoked intent is for a target CPS that is not permitted for the particular user, such as if the user is a child and the intent is for a shopping CPS.

As can be appreciated, the processing to determine ranked plan data 159 may be complex, particularly given the multiple different NLU hypotheses of NLU output data 625, policy data 725, and other data to consider. As such, the ranked plan data 159 may not include every item of data needed to actually execute the plan. For example, specific user experiences (e.g., specific output messages, etc.) may be used to augment the plan data and the handoff controller 185. In the case of certain plan data (for example, a plan to execute the intent), the plan may not need further supplemental data filled in by the handoff controller 185 and may simply be handled by another component, such as orchestrator 230. However availability of the handoff controller 185 allows certain aspects of processing for the particular utterance to be customized based on various factors (user ID, involved CPSs, etc.) without such details needing to be incorporated into the policy data 725 or otherwise handled by the plan determination component 720.

For example, the plan data may indicate a structure for a determined handoff type and the handoff controller 185 may use the plan data to generate augmented plan data which includes information that may be used by downstream components (such as orchestrator 230, TTS 280, etc.) to actually execute the handoff. The plan data 159 may specify one or more sections (e.g., data fields) to be filled in the plan, where each section corresponds to an operation to be performed by the system. The plan data 159 may specify a format of the sections. For example, the plan data 159 may describe an operation according to a handoff pre-roll; that is, a message informing a user that a CPS other than the requested CPS will handle the user's command. The plan data 159 may describe the pre-roll data field that is used by the handoff controller 185 to fill in actual content of message to the user using TTS settings associated with the first CPS. Similarly, the plan data 159 may describe a post-roll data field that may be used for a barge-in handoff type. The post-roll data field may be processed by the handoff controller 185 to generate a verbal message in a second speech style associated with the second CPS. The plan data 159 may also include an instruction for the system to execute a physical acknowledgement of the handoff, for example in the first plan illustrated in FIG. 8. The actual implementation of the particular physical acknowledgement for the specific instance may be determined by the handoff controller 185 as appropriate for that particular handoff. For example, in one situation the physical acknowledgement may involve changing the color of an output light from one color to another (thus representing the handoff from one assistant to another). In another situation, the handoff controller 185 may instruct a device 110 to perform a physical action (such as a monitor rotation, a mechanical operation, etc.) in the case of a device 110 capable of movement such as a robot, vehicle, device with a rotatable display, etc. Such a physical action may represent the handoff from one assistant to another. The plan data 159 may describe a command execution section that may include an instruction to call a skill or skill system based on a setting associated with the second CPS. The plan data 159 may describe additional operations for other handoff types, including updating visual themes presented by the device for indicating visually which CPS is active at a given moment. The plan data 159 may specify an order of the operations as reflected by the order of sections in the plan data. The handoff controller 185 may use the plan data 159 to generate augmented plan data that may be processed by a downstream component.

In this manner the plan determination component 720/policy data 725 may be configured to determine how a particular utterance should be managed without necessarily having to be trained to comprehend all the different permutations of customer experience outputs (e.g., output text, physical device controls, output sounds, etc.) that may be called for in particular situations. Instead, the plan data 159 may indicate when such customer experience are to happen, but the handoff controller 185 may coordinate, based on the context of the particular utterance, the actual content/display/order of the particular customer experience output that is appropriate for the particular utterance. This division of responsibility between the plan determination component 720 (which may determine when content is to be output in an assistant agnostic manner) and the handoff controller 185 (which then fills in agent-specific content) allows for centralized components to manage handoff between different assistants in a comprehensive, yet manageable, manner.

The supplemental data used to augment the plan by the handoff controller 185 may depend on a variety of factors beyond the plan data such as the target CPS and/or source CPS "assistant profile." The assistant profile may include data related to the voice characteristics to be used by a TTS component when synthesizing speech "spoken" by the assistant. The assistant profile may also include data related to the word choices/"personality" of the assistant which may be used by an NLG component 279 when determining what words should be used to fill the plan data. The handoff controller 185 may also use user ID/device ID information to determine how the system should fill the plan data. For example, a plan calling for a handoff message may result in the handoff controller 185 determining a TTS audio message for one circumstance, but a different audio message (for example a beep or tone) for a different circumstance, and still a visual message (shown on a display 302) for a different circumstance (for example a deaf user), and still a different visual indicator (for example a light ring may change color to indicate a change in assistant for a device without a display 302) under different circumstances. The handoff controller 185 may also, within the structure of the plan, control for timing of multiple outputs. For example the handoff controller 185 may indicate a light should change color at the same time a TTS output happens or the handoff controller 185 may indicate a light should change color before a TTS output begins. Many such examples are possible.

The handoff controller 185 may actually generate augmented plan data for more than one of the ranked plans in the ranked plan data 159. For example, if two plans represented in the ranked plan data 159 call for a message to the user based on the plan, the handoff controller 185 may determine data to be filled in for both of those plans, even if one is not the top scoring plan of the ranked plan data 159. The handoff controller 185 may thus fill in data for many different ranked plans so that the augmented plan data may be processed by a downstream component (e.g., the orchestrator 230).

While the handoff controller 185 may be capable of augmenting plan data 159 by filling in data used to execute the plan the handoff controller 185 may not be capable of actually altering the plan by removing or potentially reordering components of the plan. This will allow the plan determination component 720 to retain control over certain aspects of the un-augmented plan without interference by the handoff controller 185.

Figure 9:
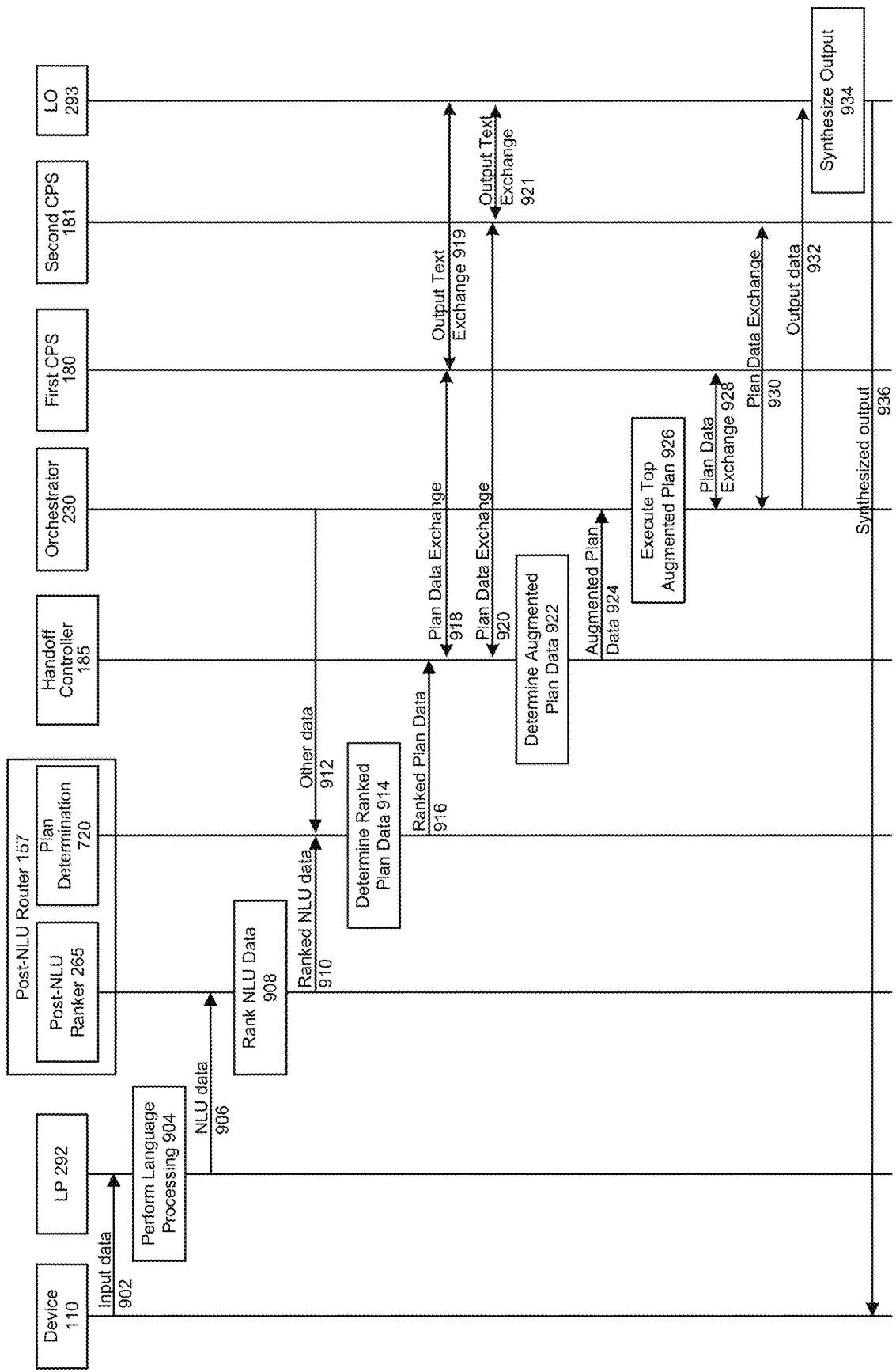
FIG. 9 is a data flow diagram illustrating selection and execution of a plan to handle an utterance in a multiple virtual assistant system, according to embodiments of the present disclosure.

FIG. 9 is a signal flow diagram further illustrating example operations of the virtual assistant system 100, according to embodiments of the present disclosure. In the example operations shown in FIG. 9, the system 100 uses various information to determine a ranked set of execution plans which are then augmented and then the top plan is executed. The diagram illustrates communications between the device 110, the orchestrator component 230, the language processing component 292, the post NLU-ranker 265 and plan determination component 720 (within the post-NLU router 157), the handoff controller 185, a first CPS 180 and second CPS 181 and language output component 293. Some operations may be omitted for clarity. Further, while some data may be exchanged between components using a routing component (e.g., orchestrator 230), for ease of illustration components are shown communicating directly with each other in certain circumstances.

The device 110 may receive an input representing, for example, a command: "roll down my windows." The command may be accompanied by a gesture such as a press of the button or preceded by a wakeword, for example "Alexa." The device may send (902) the input data to a language processing component 292. The language processing component 292 may perform (904) language processing such as that described herein. If the input data includes audio data 111 the language processing component 292 may perform ASR on the audio data to determine ASR data 610. The language processing component 292 may also perform NLU on the ASR data 610 and/or input text data 213. The language processing component 292 may determine NLU data, for example NLU results data 685, and may send it (906) to the post-NLU ranker 265. The post-NLU ranker may then rank (908) the NLU data and send (910) the ranked NLU data (for example, NLU output data 625) to the plan determination component 720. The plan determination component 720 may then receive (912) other data from the orchestrator 230. Such other data may include, for example, other data 620, context data 708, or other data either from the orchestrator 230 and/or other sources. The plan determination component 720 may process the various data, including the policy data 725 to determine (914) ranked plan data 159. The plan determination component 720 may then send (916) the ranked plan data 159 to the handoff controller 185.

In the example, the target assistant for "roll down my windows" may be a general assistant (for example, "Alexa") that may not be capable of executing the intent (e.g., rolling down the windows of a vehicle 110*a*). In this scenario at least one plan of the ranked plan data 159 may indicate a handoff from the first CPS of Alexa to a second CPS, for example "Hal," where the handoff includes a message from Alexa that Hal will handle the command and involves transfer of utterance data to the second CPS for execution. For further example, also in the ranked plan data 159 may be a plan indicating utterance processing should be terminated but a voice message from "Hal" should be output indicating that it is the proper assistant to handle the command the user should ask again, only this time, should ask Hal.

The handoff controller 185 may then obtain data from a variety of sources for purposes of filling the plan data. For example, the handoff controller 185 may exchange data (918) with a first CPS 180 and/or may exchange data (920) with a second CPS 181. For example the handoff controller 185 may determine that one plan in the ranked plan data 159 calls for a handoff message in the "voice" of the first CPS indicating a transfer to the second CPS. Thus the handoff controller 185 may send data indicating this handoff message to the first CPS 180. The first CPS 180 may exchange data (919) with an NLG component 279 (which may be part of the language output component 293) to obtain text of the handoff message, where the text is appropriate for the first CPS 180. The first CPS 180 may then send that text to the handoff controller 185 for purposes of filling data for that particular plan involving the handoff.

In another example, the handoff controller 185 may determine that one plan in the ranked plan data 159 calls for a termination message in the "voice" of the second CPS 181. Thus the handoff controller 185 may send data indicating this termination message to the second CPS 181. The second CPS 181 may exchange data (921) with an NLG component 279 (which may be part of the language output component 293) to obtain text of the termination message, where the text is appropriate for the second CPS 181. The second CPS 181 may then send that text to the handoff controller 185 for purposes of filling data for that particular plan involving the termination. The handoff controller 185 may then insert the text of the respective outputs to the ranked plan data 159 to determine (922) augmented plan data where the augmented plan data includes the ranked plan data 159 as well as the other information, such as user experience information, added by the handoff controller 185. The handoff controller 185 may then send (924) the augmented plan data to the orchestrator 230. Although the augmented plan data may be ranked with the individual plans in the same order as the ranked plan data 159, the orchestrator 230 (or other component) may re-rank the plans once the augmented plan data is available.

As part of determining the augmented plan data the handoff controller 185 may exchange a variety of data with one or more CPSs. The handoff controller 185 may send various plan data including source assistant, target assistant, domain, intent, slot, action type (e.g. handoff type, termination type, execution type, etc.), user ID, device ID, unit ID (which may represent a user, family, etc.), and/or other data. Such data may be processed by the CPS (for example by a replanner 150 of a CPS) to determine the data needed by the handoff controller 185 to fill the plan.

Returning to the example of FIG. 9, the orchestrator 230 may then execute (926) the top ranked (e.g., highest scoring) plan using the augmented plan data. In the example above, the top ranked plan may be the plan to handoff the utterance requesting window roll-down from Alexa to Hal. To execute the plan the orchestrator 230 may go through the plan steps to execute each particular instruction/step of the plan as indicated in the augmented plan data. This may involve a data exchange between the orchestrator 230 and first CPS 180 (e.g., 928) and/or a data exchange between the orchestrator 230 and second CPS 181 (e.g., 930). For example, the orchestrator 230 may send the first CPS 180 an indication that the utterance will be processed using the second CPS 181. The orchestrator 230 may also send the second CPS 181 information related to the utterance, for example, an intent from NLU output data 625, a user ID, utterance ID, etc. The orchestrator 230 may also send (932) output data to the language output component 293. This output data may include the text of the handoff message augmented by the handoff controller 185. The language output component 293 may then synthesize (934) a TTS output and may send (936) the synthesized output (e.g., output audio data 1190) to the device 110 for playback.

In certain examples the orchestrator 230 may attempt to execute a top ranked augmented plan but may encounter an error of some kind. For example, a top ranked plan may call for one user device 110*a* to output an indicator but that device has become inactive so therefore a different plan may need to be executed. If a top ranked plan fails, the orchestrator 230 may work its way through the remaining plans (for example, in order of rank) until one of the augmented plans executes properly.

Figure 10:
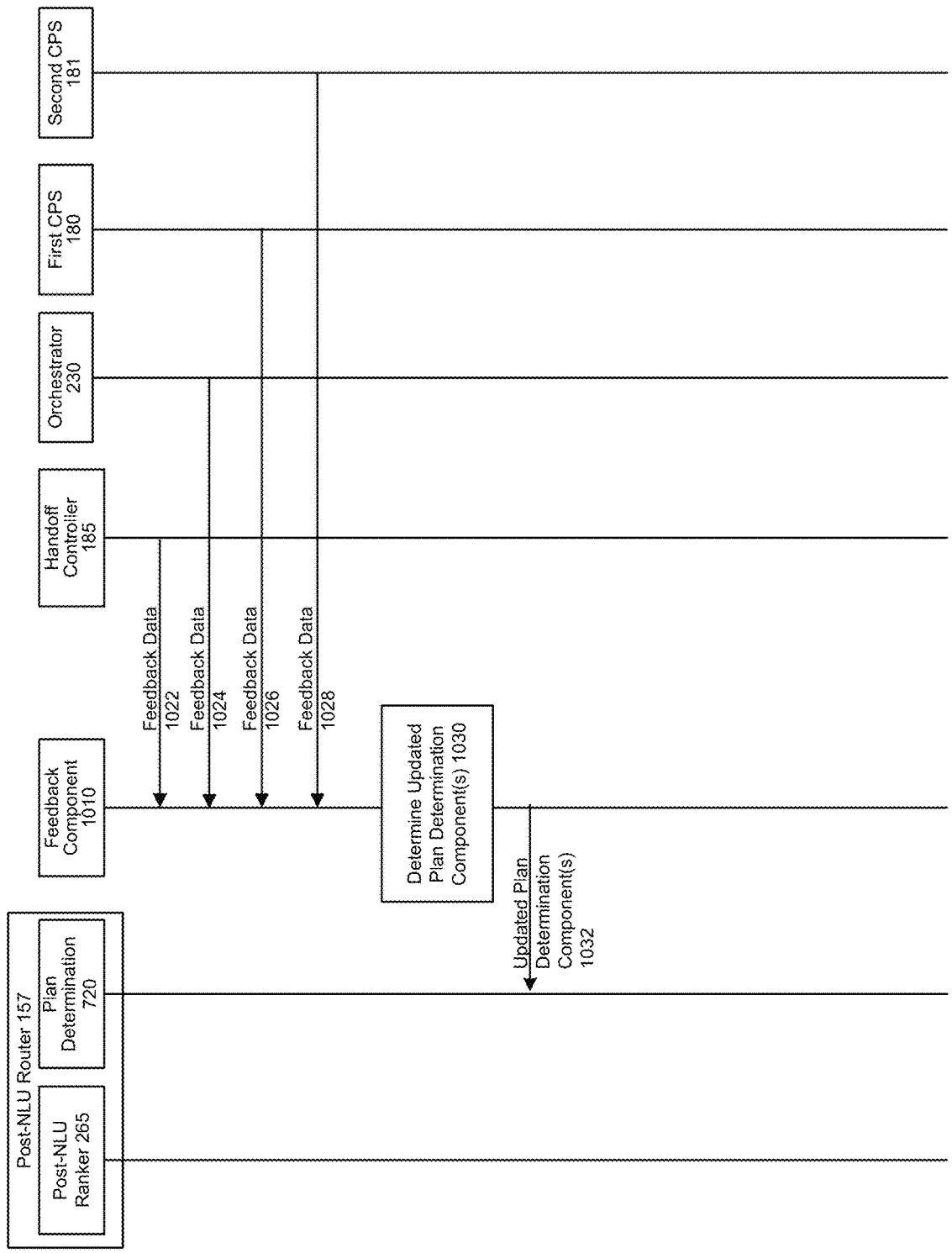
FIG. 10 illustrates a data flow diagram illustrating feedback and retraining of a centralized plan determination component, according to embodiments of the present disclosure.

In order to improve system operation, particularly for a centralized component such as the plan determination component 720 the system may coordinate feedback for purposes of retraining/updating the plan determination component 720 and/or policy data 725. For example, as shown in FIG. 10, a feedback component 1010 may receive feedback data from a handoff controller 185 (1022), the orchestrator 230 (1024), a first CPS 180 (1026), a second CPS 181 (1028) and/or other components. The feedback data may indicate what ultimate plan was executed from the ranked plan data 159. The feedback data may indicate what errors (if any) were encountered when attempting to fill data in to, or execute, a particular plan. The feedback data may indicate changes in operational conditions of one or more CPSs or other system components that may impact operations of the plan determination component 720. Such feedback data may come from multiple sources, including multiple CPSs. The feedback data may be processed by the feedback component 1010 to determine (1030) updated plan determination component(s). Such components may include updated policy data 725, updated aspects of the plan determination component 720 (including one or more trained models), etc. Such updated components may be sent to/incorporated in (1032) the post-NLU router 157. Although illustrated for plan determination feedback, a similar approach as that illustrated in FIG. 10 may also take place to provide feedback/retraining for other components such as handoff controller 185, etc.

The feedback operations may allow the system to determine, and correct for, situations where certain handoffs between certain CPSs are not working properly, certain types of handoffs aren't working properly, certain types of handoffs are receiving poor user feedback, which customer experiences are received well and which are received poorly, etc. This may involve, for example, comparing the details of an ultimately executed plan with the ranked plan data 159 to determine if, for example, a top ranked plan in the ranked plan data 159 encountered an error for some reason, resulting in a lower ranked plan being executed. It may also involve comparing the relative feedback related to certain customer experiences (for example a long handoff message versus a short handoff message) to adjust those as appropriate.

The centralized aspect of the plan determination component 720 allows for such feedback to be incorporated more efficiently than if the system relied on multiple components (e.g., replanners 150) for each CPS, which would require retraining of multiple components for each feedback iteration.

Figure 11:
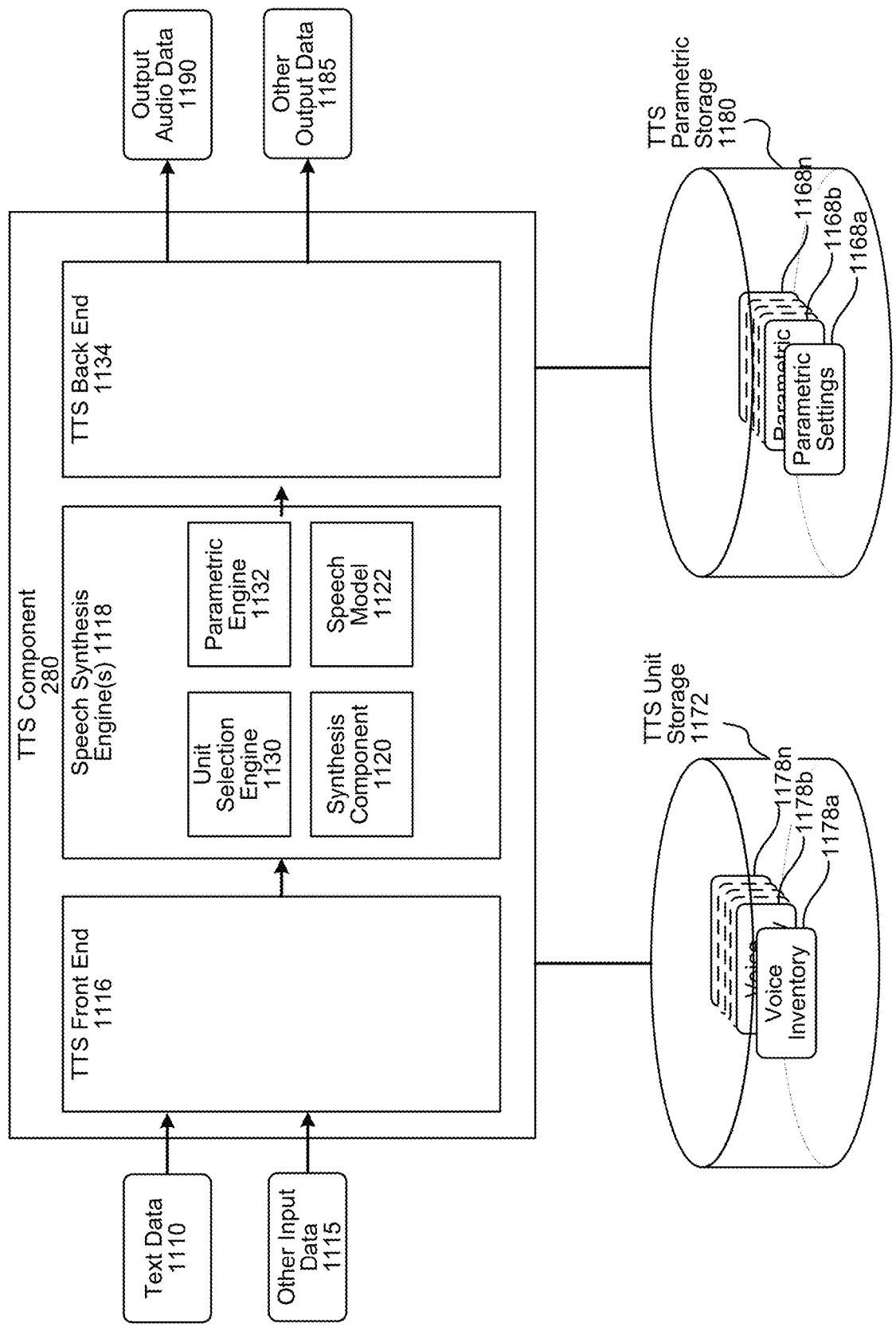
FIG. 11 is a conceptual diagram of text-to-speech components according to embodiments of the present disclosure.

Components of a system that may be used to perform unit selection, parametric TTS processing, and/or model-based audio synthesis are shown in FIG. 11. As shown in FIG. 11, the TTS component/processor 280 may include a TTS front end 1116, a speech synthesis engine 1118, TTS unit storage 1172, TTS parametric storage 1180, and a TTS back end 1134. The TTS unit storage 1172 may include, among other things, voice inventories 1178*a*-1178*n* that may include pre-recorded audio segments (called units) to be used by the unit selection engine 1130 when performing unit selection synthesis as described below. The TTS parametric storage 1180 may include, among other things, parametric settings 1168*a*-1168*n* that may be used by the parametric synthesis engine 1132 when performing parametric synthesis as described below. A particular set of parametric settings 1168 may correspond to a particular voice profile (e.g., whispered speech, excited speech, etc.).

In some embodiments, the system 110 may leverage the voice inventories 1178 and/or parametric settings 1168 to provide different assistants with different personalities as reflected in respective speech styles. For example, a first assistant could be associated with a first voice inventory 1178*a* and first parametric settings 1168*a*, and a second assistant could be associated with a second voice inventory 1178*b* and second parametric settings 1168*b*. Thus, the system 100 call the TTS component 280 for synthesized speech generation based on a particular assistant, and the TTS component 280 may return synthesized speech in a speech style (e.g., using certain audio characteristics) indicative of that assistant. The user will thus be able to tell with which assistant he or she is interacting with at a given time based on the speech style of the synthetic voice alone. A change in the speech style of the synthetic voice can indicate to the user that a handoff from one assistant to another will or has occurred.

For example, the system 100 may receive a command with an indication that the first assistant is the requested assistant to handle the command. The system 100 may, however, select the second assistant as better able to handle the command. The system 100 may call the TTS component 280 to generate a first message as the first assistant (e.g., using audio characteristics corresponding to the "voice" of the first assistant/first CPS) to indicate that the command will be handled by the second assistant. The TTS component 280 may thus return a handoff message in a first speech style corresponding to the first assistant. The system may then call the TTS component 280 to generate a second message as the second assistant (e.g., using audio characteristics corresponding to the "voice" of the second assistant/second CPS) to convey a result corresponding to the command. The TTS component 280 may thus return a response message in a second speech style corresponding to the second assistant.

In various embodiments of the present disclosure, model-based synthesis of audio data may be performed using by a speech model 1122 and a TTS front-end 1116. The TTS front-end 1116 may be the same as front ends used in traditional unit selection or parametric systems. In other embodiments, some or all of the components of the TTS front end 1116 are based on other trained models. The present disclosure is not, however, limited to any particular type of TTS front end 1116. The speech model 1122 may be used to synthesize speech without requiring the TTS unit storage 1172 or the TTS parametric storage 1180, as described in greater detail below.

TTS component receives text data 1110. Although the text data 1110 in FIG. 11 is input into the TTS component 280, it may be output by other component(s) (such as a skill 290, NLU component 260, NLG component 279 or other component) and may be intended for output by the system. Thus in certain instances text data 1110 may be referred to as "output text data." Further, the data 1110 may not necessarily be text, but may include other data (such as symbols, code, other data, etc.) that may reference text (such as an indicator of a word) that is to be synthesized. Thus data 1110 may come in a variety of forms. The TTS front end 1116 transforms the data 1110 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1118. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1110, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1116 may also process other input data 1115, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1110 and/or the text for a TTS request may be accompanied by separate metadata indicating what text should be whispered (or have some other indicated audio characteristic). The speech synthesis engine 1118 may compare the annotated phonetic units models and information stored in the TTS unit storage 1172 and/or TTS parametric storage 1180 for converting the input text into speech. The TTS front end 1116 and speech synthesis engine 1118 may include their own controller(s)/processor(s) and memory or they may use the controller/processor and memory of the server 120, device 110, or other device, for example. Similarly, the instructions for operating the TTS front end 1116 and speech synthesis engine 1118 may be located within the TTS component 280, within the memory and/or storage of the server 120, device 110, or within an external device.

Text data 1110 input into the TTS component 280 may be sent to the TTS front end 1116 for processing. The front-end may include components for performing text normalization, linguistic analysis, linguistic prosody generation, or other such components. During text normalization, the TTS front end 1116 may first process the text input and generate standard text, converting such things as numbers, abbreviations (such as Apt., St., etc.), symbols ($, %, etc.) into the equivalent of written out words.

During linguistic analysis, the TTS front end 1116 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 1172. The linguistic analysis performed by the TTS front end 1116 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 1116 may then perform linguistic prosody generation where the phonetic units are annotated with desired prosodic characteristics, also called acoustic features, which indicate how the desired phonetic units are to be pronounced in the eventual output speech. During this stage the TTS front end 1116 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1116, which may be referred to as a symbolic linguistic representation, may include a sequence of phonetic units annotated with prosodic characteristics. This symbolic linguistic representation may be sent to the speech synthesis engine 1118, which may also be known as a synthesizer, for conversion into an audio waveform of speech for output to an audio output device and eventually to a user. The speech synthesis engine 1118 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1118 may perform speech synthesis using one or more different methods. In one method of synthesis called unit selection, described further below, a unit selection engine 1130 matches the symbolic linguistic representation created by the TTS front end 1116 against a database of recorded speech, such as a database (e.g., TTS unit storage 1172) storing information regarding one or more voice corpuses (e.g., voice inventories 1178a-n). Each voice inventory may correspond to various segments of audio that was recorded by a speaking human, such as a voice actor, where the segments are stored in an individual inventory 1178 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1130 may then use the information about each unit to select units to be joined together to form the speech output.

The unit selection engine 1130 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1120) to form output audio data 1190 representing synthesized speech. Using all the information in the unit database, a unit selection engine 1130 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1132, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1120) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS unit storage 1172 based on feedback of the results of TTS processing, thus enabling the TTS component 280 to improve speech synthesis.

The TTS unit storage 1172 may be customized for an individual user based on his/her individualized desired speech output. In particular, the speech unit stored in a unit database may be taken from input audio data of the user speaking. For example, to create the customized speech output of the system, the system may be configured with multiple voice inventories 1178a-1178n, where each unit database is configured with a different "voice" to match desired speech qualities. Such voice inventories may also be linked to user accounts. The voice selected by the TTS component 280 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1178 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1168) and used for speech synthesis when the specific speech quality is desired. Customized voices may be created based on multiple desired speech qualities combined (for either unit selection or parametric synthesis). For example, one voice may be "shouted" while another voice may be "shouted and emphasized." One voice may correspond to a first CPS while another voice may correspond to a second CPS. Many such combinations are possible.

Unit selection speech synthesis may be performed as follows. Unit selection includes a two-step process. First a unit selection engine 1130 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1130. As part of unit selection, the unit selection engine 1130 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1172 or in another storage component. For example, different unit selection databases may be stored in TTS unit storage 1172. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1118 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 1132 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1116.

The parametric synthesis engine 1132 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1118, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1132 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1132 may lead to a number of potential audio output sequences. Based on the acoustic model and other potential models, the potential audio output sequences may be scored according to a confidence level of the parametric synthesis engine 1132. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1168, which may represent acoustic settings matching a particular parametric "voice", may be used by the synthesis component 1120 to ultimately create the output audio data 1190.

When performing unit selection, after a unit is selected by the unit selection engine 1130, the audio data corresponding to the unit may be passed to the synthesis component 1120. The synthesis component 1120 may then process the audio data of the unit to create modified audio data where the modified audio data reflects a desired audio quality. The synthesis component 1120 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 280. For each unit that corresponds to the selected portion, the synthesis component 1120 may process the audio data for that unit to create a modified unit audio data. The modified unit audio data may then be concatenated to form the output audio data 1190. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 280. In that case, other output data 1185 may be output along with the output audio data 1190 so that an ultimate playback device (e.g., device 110) receives instructions for playback that can assist in creating the desired output audio. Thus, the other output data 1185 may include instructions or other data indicating playback device settings (such as volume, playback rate, etc.) or other data indicating how output audio data including synthesized speech should be output. For example, for whispered speech, the output audio data 1190 may include other output data 1185 that may include a prosody tag or other indicator that instructs the device 110 to slow down the playback of the output audio data 1190, thus making the ultimate audio sound more like whispered speech, which is typically slower than normal speech. In another example, the other output data 1185 may include a volume tag that instructs the device 110 to output the speech at a volume level less than a current volume setting of the device 110, thus improving the quiet whisper effect.

One or more models implemented by components of the orchestrator component 230, post-NLU ranker 265, shortlister 550, plan determination component 720, handoff controller 185, or other component may be trained and operated according to various machine learning techniques.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 12:
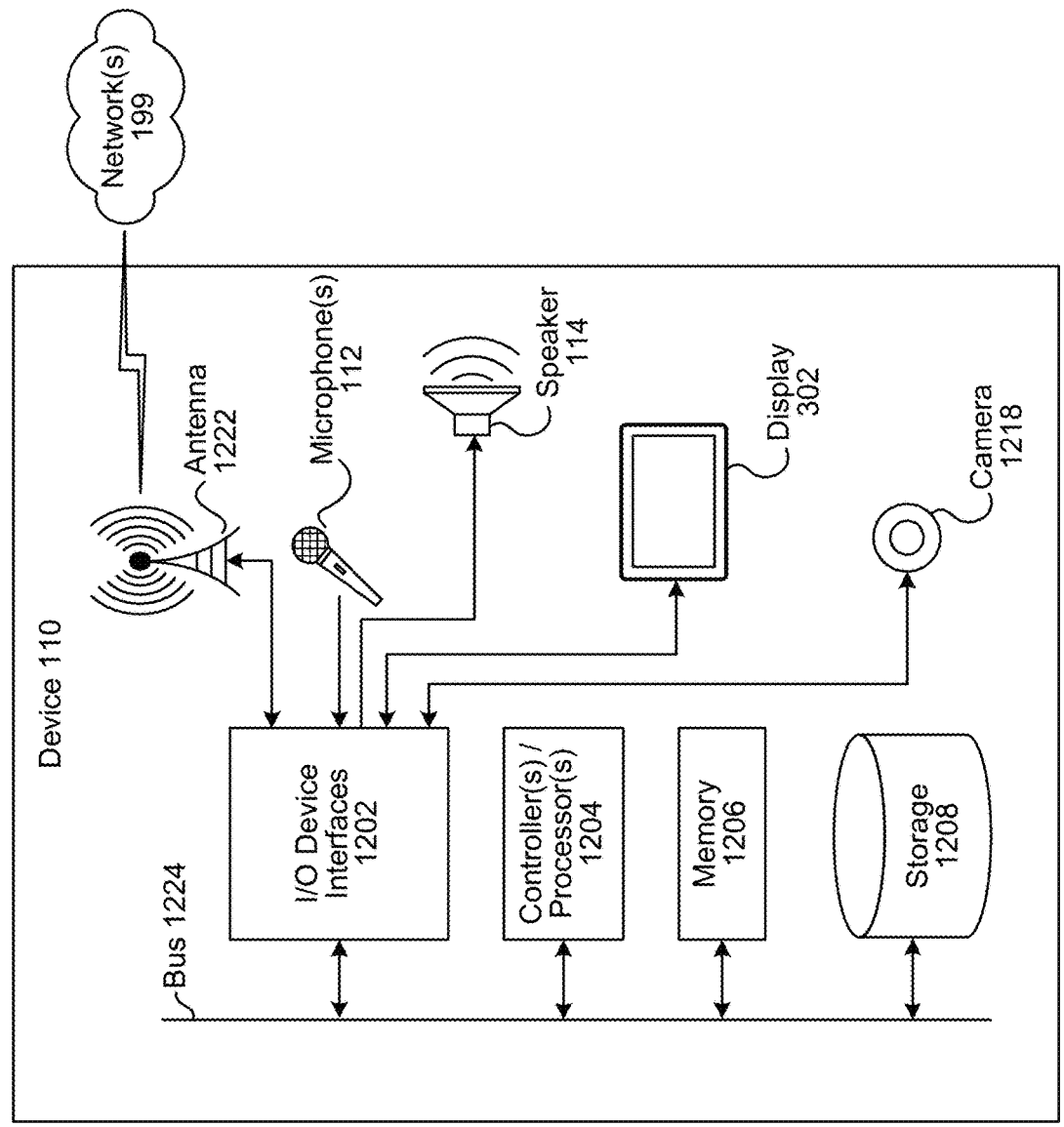
FIG. 12 is a block diagram conceptually illustrating example components of a device, according to embodiments of the present disclosure.
Figure 13:
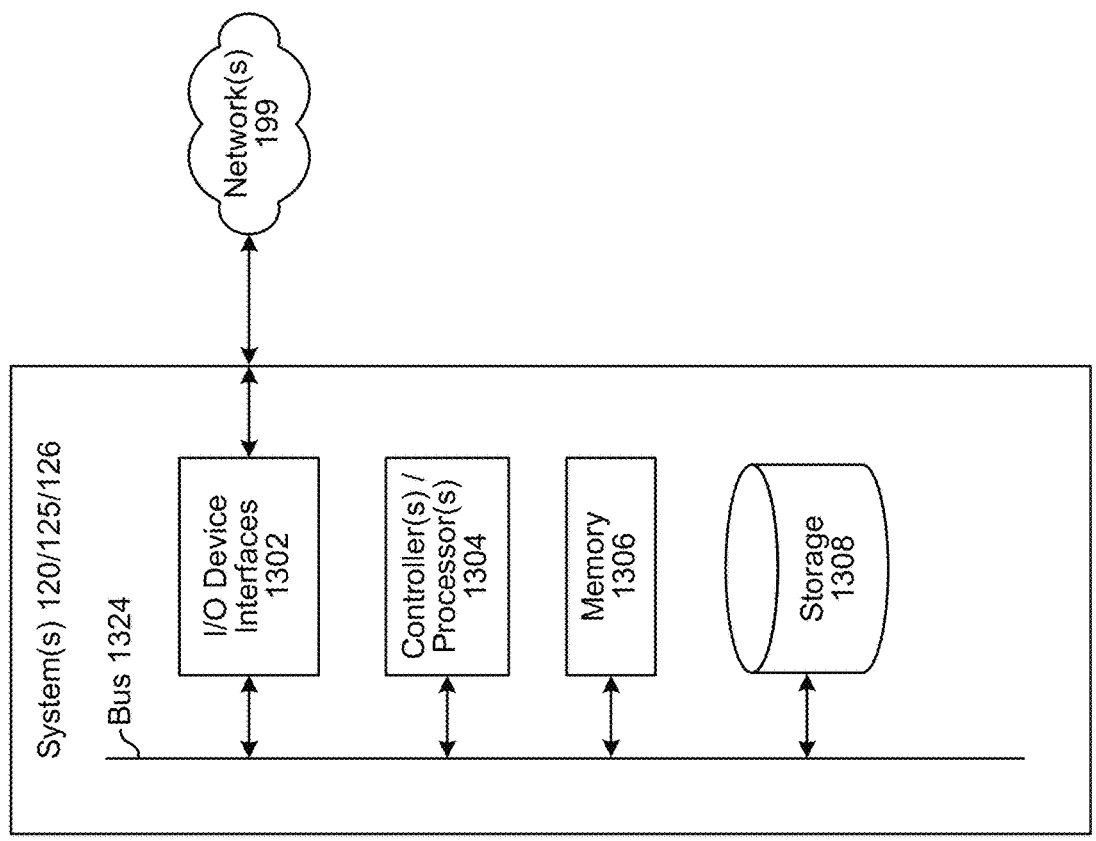
FIG. 13 is a block diagram conceptually illustrating example components of a system, according to embodiments of the present disclosure.

FIG. 12 is a block diagram conceptually illustrating a device 110 that may be used with the system. FIG. 13 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 114, a wired headset or a wireless headset (not illustrated), or other component capable of outputting audio. The device 110 may also include an audio capture component. The audio capture component may be, for example, a microphone 112 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 302 for displaying content. The device 110 may further include a camera 1218.

Via antenna(s) 1222, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1202/1302), processor(s) (1204/1304), memory (1206/1306), and/or storage (1208/1308) of the device(s) 110, natural language command processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

Figure 14:
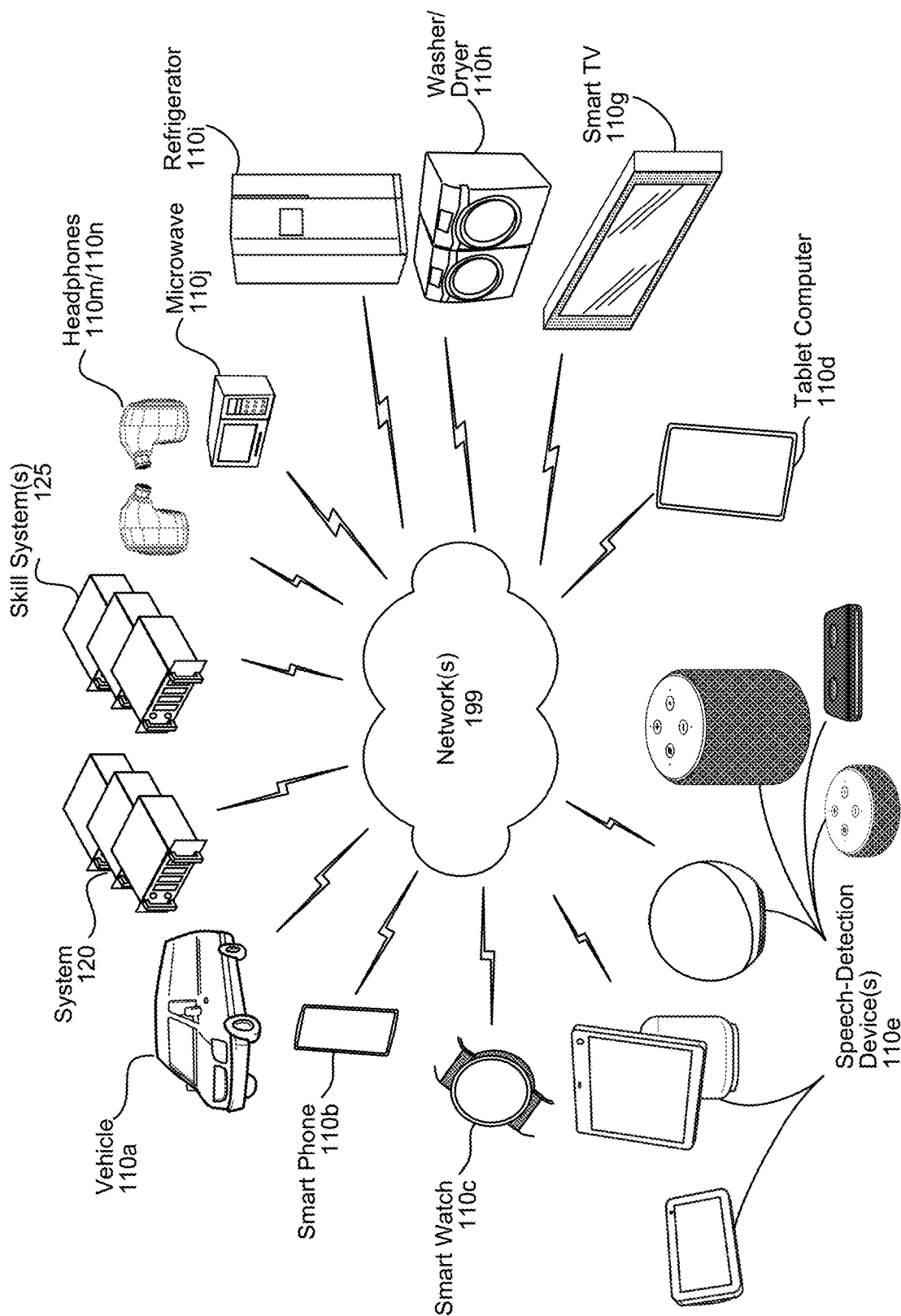
FIG. 14 illustrates an example of a computer network for use with the overall system, according to embodiments of the present disclosure.

As illustrated in FIG. 14, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a speech-detection device 110e, a display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a voice-controlled device, first input audio data representing a command and a first indication of a first assistant requested for handling the command;
determining, in response to receiving the first indication, that a first command processing subsystem (CPS) corresponds to the first assistant;
performing speech processing on the first input audio data to determine first natural language understanding (NLU) result data including a first skill and a first intent;
determining a second CPS associated with the first skill;
sending, to a first component configured to generate data representing operations for responding to the command, a first identifier of the first CPS, the first NLU result data, and a second identifier of the second CPS;
sending, to the first component, policy data representing information related to interactions between the first CPS and second CPS;
determining, by the first component, output plan data corresponding to potential execution corresponding to the command, the output plan data comprising:
first plan data representing a handoff between the first CPS and the second CPS, the first plan data corresponding to:
a first message indicating the handoff,
a first operation to be executed by the second CPS in response to the command, and
a first score, and
second plan data representing termination of processing with regard to the command, the second plan data corresponding to:
a second message indicating the termination of processing, and
a second score;
sending the output plan data to a second component for augmenting the output plan data;
processing the first plan data using the second component to determine first text data corresponding to the first message;
processing the second plan data using the second component to determine second text data corresponding to the second message;
determining first augmented plan data comprising the first plan data and the first text data;
determining second augmented plan data comprising the second plan data and the second text data; and
based at least in part on the first score and the second score, causing further processing with regard to the first augmented plan data.

2. The computer-implemented method of claim 1, further comprising:
sending, to the second CPS, first data representing the first operation and the first intent;
receiving, from the second CPS, first output data;
sending, to a speech synthesis component, the first text data;
receiving, from the speech synthesis component, output audio data corresponding to the first message, the output audio data corresponding to audio characteristics corresponding to the second CPS; and
sending, to the voice-controlled device, the output audio data and the first output data.

3. The computer-implemented method of claim 1, further comprising:
sending, to the second CPS, first data representing the first operation;
receiving, from the second CPS, an indication of an error corresponding to the first operation;
in response to the indication of the error, sending, to a speech synthesis component, the second text data;
receiving, from the speech synthesis component, output audio data corresponding to the second message, the output audio data corresponding to audio characteristics corresponding to the first CPS;
sending, to the voice-controlled device, the output audio data; and
ceasing further processing with regard to the command.

4. The computer-implemented method of claim 3, further comprising, after ceasing further processing with regard to the command:
receiving, from the second CPS, first feedback data corresponding to the indication of the error;
receiving, from the first CPS, second feedback data corresponding to the first intent;
processing the first feedback data and second feedback data to determine update data corresponding to the first component; and
determining an updated first component based at least in part on the update data.

5. A computer-implemented method comprising:
receiving, from a first device, first input data representing a command and a first indication of a first command processing subsystem (CPS);
performing natural language understanding (NLU) processing based on the first input data to determine first NLU result data including a skill and an intent;
determining a second CPS associated with the skill;
sending, to a first component, a first identifier of the first CPS, the NLU result data, and a second identifier of the second CPS;
determining, by the first component, first data corresponding to potential execution of the command, the first data comprising:
a first portion corresponding to a handoff between the first CPS and the second CPS, and
a second portion corresponding to termination of processing with regard to the command; and
processing the first portion and the second portion to select one of the handoff or the termination of processing.

6. The computer-implemented method of claim 5, further comprising:
sending the first data to a second component;
processing the first portion using the second component to determine first text data corresponding to a first message indicating the handoff;

processing the second portion using the second component to determine second text data corresponding to a second message indicating the termination of processing;

determining first augmented data comprising the first portion and the first text data; and determining second augmented data comprising the second portion and the second text data.

7. The computer-implemented method of claim 6, further comprising:

sending, from the second component to the second CPS, a first indication of the handoff;

receiving, from the second CPS, the first text data; and including, as part of the first augmented data, a second indication that the first text data is to be synthesized using audio characteristic data corresponding to the second CPS.

8. The computer-implemented method of claim 7, further comprising:

sending, to the second CPS, an instruction to execute the intent;

receiving, from the second CPS, first output data;

sending, to a speech synthesis component, the first text data and the second indication;

receiving, from the speech synthesis component, output audio data corresponding to the first message, the output audio data corresponding to the audio characteristic data corresponding to the second CPS; and sending, to the first device, the output audio data and the first output data.

9. The computer-implemented method of claim 6, further comprising:

sending, from the second component to the first CPS, a first indication of the termination;

receiving, from the first CPS, the second text data; and including, as part of the second augmented data, a second indication that the second text data is to be synthesized using audio characteristic data corresponding to the first CPS.

10. The computer-implemented method of claim 9, further comprising:

sending, to a speech synthesis component, the second text data and the second indication;

receiving, from the speech synthesis component, output audio data corresponding to the first message, the output audio data corresponding to the audio characteristic data corresponding to the second CPS;

sending, to the first device, the output audio data; and ceasing further processing with regard to the command.

11. The computer-implemented method of claim 6, further comprising:

determining the first text data based at least in part on a profile associated with the first input data.

12. The computer-implemented method of claim 5, wherein:

the first portion comprises a first score corresponding to the handoff;

the second portion comprises a second score corresponding to the termination of processing; and processing the first portion and the second portion comprises processing the first score with respect to the second score to select one of the handoff or the termination of processing.

13. A system, comprising:

at least one processor; and at least one memory comprising instructions that, when executed by the at least one processor, cause the system to:

receive, from a first device, first input data representing a command and a first indication of a first command processing subsystem (CPS);

perform natural language understanding (NLU) processing based on the first input data to determine first NLU result data including a skill and an intent;

determine a second CPS associated with the skill;

send, to a first component, a first identifier of the first CPS, the NLU result data, and a second identifier of the second CPS;

determine, by the first component, first data corresponding to potential execution of the command, the first data comprising:

a first portion corresponding to a handoff between the first CPS and the second CPS, and a second portion corresponding to termination of processing with regard to the command; and process the first portion and the second portion to select one of the handoff or the termination of processing.

14. The system of claim 13, wherein the at least one memory further comprises instructions that, when executed by the at least one processor, further cause the system to:

send the first data to a second component;

process the first portion using the second component to determine first text data corresponding to a first message indicating the handoff;

process the second portion using the second component to determine second text data corresponding to a second message indicating the termination of processing;

determine first augmented data comprising the first portion and the first text data; and determine second augmented data comprising the second portion and the second text data.

15. The system of claim 14, wherein the at least one memory further comprises instructions that, when executed by the at least one processor, further cause the system to:

send, from the second component to the second CPS, a first indication of the handoff;

receive, from the second CPS, the first text data; and include, as part of the first augmented data, a second indication that the first text data is to be synthesized using audio characteristic data corresponding to the second CPS.

16. The system of claim 15, wherein the at least one memory further comprises instructions that, when executed by the at least one processor, further cause the system to:

send, to the second CPS, an instruction to execute the intent;

receive, from the second CPS, first output data;

send, to a speech synthesis component, the first text data and the second indication;

receive, from the speech synthesis component, output audio data corresponding to the first message, the output audio data corresponding to the audio characteristic data corresponding to the second CPS; and send, to the first device, the output audio data and the first output data.

17. The system of claim 14, wherein the at least one memory further comprises instructions that, when executed by the at least one processor, further cause the system to:

send, from the second component to the first CPS, a first indication of the termination;

receive, from the first CPS, the second text data; and include, as part of the second augmented data, a second indication that the second text data is to be synthesized using audio characteristic data corresponding to the first CPS.

18. The system of claim 17, wherein the at least one memory further comprises instructions that, when executed by the at least one processor, further cause the system to:
send, to a speech synthesis component, the second text data and the second indication;
receive, from the speech synthesis component, output audio data corresponding to the first message, the output audio data corresponding to the audio characteristic data corresponding to the second CPS;
send, to the first device, the output audio data; and
cease further processing with regard to the command.

19. The system of claim 14, wherein the at least one memory further comprises instructions that, when executed by the at least one processor, further cause the system to:
determine the first text data based at least in part on a profile associated with the first input data.

20. The system of claim 13, wherein:
the first portion comprises a first score corresponding to the handoff;
the second portion comprises a second score corresponding to the termination of processing; and
the instructions that cause the system to process the first portion and the second portion comprise instructions that, when executed by the at least one processor, further cause the system to process the first score with respect to the second score to select one of the handoff or the termination of processing.

* * * * *